United States Patent
Aggarwal et al.

(10) Patent No.: US 12,165,192 B2
(45) Date of Patent: Dec. 10, 2024

(54) IDENTIFYING OBJECT OF INTEREST FOR HANDICAPPED INDIVIDUALS BASED ON EYE MOVEMENT PATTERNS

(71) Applicant: Walmart Apollo, LLC, Bentonville, AR (US)

(72) Inventors: Parul Aggarwal, Samrala (IN); Rahul Kumar, Bangalore (IN); Mangesh N. Kulkarni Wadhonkar, Hyderabad (IN); Amit Jhunjhunwala, Bangalore (IN); Rajiv Mishra, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/539,687

(22) Filed: Dec. 14, 2023

(65) Prior Publication Data

US 2024/0112252 A1      Apr. 4, 2024

Related U.S. Application Data

(63) Continuation of application No. 17/212,152, filed on Mar. 25, 2021, now abandoned.
(Continued)

(30) Foreign Application Priority Data

Mar. 25, 2020    (IN) .............................. 202041012977

(51) Int. Cl.
*G06Q 30/0601*     (2023.01)
*G06Q 30/02*       (2023.01)
(Continued)

(52) U.S. Cl.
CPC ..... *G06Q 30/0639* (2013.01); *G06Q 30/0281* (2013.01); *G06Q 30/0633* (2013.01);
(Continued)

(58) Field of Classification Search
CPC ........... G06Q 30/0281; G06Q 30/0633; G06Q 30/0639
See application file for complete search history.

(56) References Cited

U.S. PATENT DOCUMENTS 8,510,166 B2    8/2013  Neven
9,449,343 B2    9/2016  Mayerle et al.
(Continued)

FOREIGN PATENT DOCUMENTS

CA         2989894         12/2016
WO    WO-2019089014 A1 *   5/2019    ......... G06K 9/00369

OTHER PUBLICATIONS

Analysis of Consumer Supermarket Shopping Behaviors Based on Eye Movement Information. Minzhi Gao; Fang Meng; Yan Meng. 2020 13th International Congress on Image and Signal Processing, BioMedical Engineering and Informatics (CISP-BMEI): 18-22. IEEE. (2020) (Year: 2020).*
(Continued)

*Primary Examiner* — Michael Misiaszek
(74) *Attorney, Agent, or Firm* — Foley IP Law, PLLC

(57) ABSTRACT

In some embodiments, apparatuses and methods are provided to support individuals in a retail environment. Some embodiments, provide systems, comprising: a plurality of cameras positioned in a retail store; an image processing control circuit configured to determine a customer field of view; a product identification control circuit configured to identify a set of multiple products within the identified customer field of view, assign a viewing probability to each product without the first customer having to touch the first product; a product selection control circuit configured to determine a purchase probability of the first product; add the first product to a virtual electronic cart when the purchase probability of the first product exceeds a purchase probabil-
(Continued)

ity threshold; and communicate instructions to control the worker personal computing device to instruct a worker to retrieve the first product.

20 Claims, 8 Drawing Sheets

Related U.S. Application Data

(60) Provisional application No. 62/704,367, filed on May 6, 2020.

(51) Int. Cl.
  *G06V 20/52* (2022.01)
  *G06V 10/25* (2022.01)
  *G06V 40/10* (2022.01)
  *G06V 40/16* (2022.01)
  *G06V 40/19* (2022.01)

(52) U.S. Cl.
  CPC .............. *G06V 20/52* (2022.01); *G06V 10/25* (2022.01); *G06V 40/10* (2022.01); *G06V 40/172* (2022.01); *G06V 40/174* (2022.01); *G06V 40/19* (2022.01)

(56) References Cited

U.S. PATENT DOCUMENTS

| | | | |
|---|---|---|---|
| 9,996,150 B2 | 6/2018 | Swaminathan et al. | |
| 10,140,820 B1* | 11/2018 | Zalewski | G06Q 30/0633 |
| 2014/0363059 A1 | 12/2014 | Hurewitz | |
| 2014/0365341 A1 | 12/2014 | Maclurin | |
| 2016/0004306 A1 | 1/2016 | Maltz | |
| 2018/0285422 A1* | 10/2018 | Sambasivam | G06Q 30/0258 |
| 2019/0325462 A1* | 10/2019 | Apokatanidis | G06Q 30/0609 |
| 2020/0019920 A1* | 1/2020 | Durkee | G06Q 10/087 |
| 2020/0082172 A1* | 3/2020 | Truong | G06Q 30/0201 |
| 2021/0027360 A1* | 1/2021 | Shmueli | G06F 1/163 |
| 2021/0295412 A1* | 9/2021 | Phillips | G06Q 30/0631 |
| 2021/0304256 A1* | 9/2021 | Ishida | G06V 20/52 |
| 2021/0342588 A1* | 11/2021 | Davis | G06V 20/10 |

OTHER PUBLICATIONS

Accessible Retail Shopping for the Visually Impaired Using Deep Learning. Patel, Akshar. ProQuest Dissertations and ThesesProQuest Dissertations Publishing. (2020) (Year: 2020).*

Babu, Sudharshan Chandra; "A 2019 Guide to Human Pose Estimation With Deep Learning", https://nanonets.com/blog/human-pose-estimation-2d-guide/, Apr. 12, 2019 (41 pages).

Glasgow, Dominic, "Shopping is hellish for disabled people—augmented reality could be the fix", https://blog.dundee.ac.uk/one-dundee/shopping-is-hellish-for-disabled-people-augmented-reality-could-be-the-fix/ Nov. 9, 2017 (7 pages).

Joshi, Naveen, "How Augmented Reality can help disabled persons" https://www.bbntimes.com/technology/how-augmented-reality-can-help-disabled-persons, Sep. 8, 2018 (14 pages).

Opencv "Camera Calibration and 3D Reconstruction", https://docs.opencv.org/2.4/modules/calib3d/doc/camera_calibration_and_3d_reconstruction.html, available at least as early as Nov. 18, 2026, retrieved from Internet Dec. 6, 2023, (55 pages).

* cited by examiner

IDENTIFYING OBJECT OF INTEREST FOR HANDICAPPED INDIVIDUALS BASED ON EYE MOVEMENT PATTERNS

CROSS-REFERENCE TO RELATED APPLICATION(S)

This application is a continuation of U.S. application Ser. No. 17/212,152, filed Mar. 25, 2021, which claims the benefit of U.S. Provisional Application No. 62/704,367, filed May 6, 2020, and India Application No. 202041012977, filed Mar. 25, 2020, each of which is incorporated herein by reference in its entirety.

TECHNICAL FIELD

This invention relates generally to aiding individuals in identifying items of interest through image processing.

BACKGROUND

A typical shopping experience at a retail store includes customers moving through the aisles of the tens or hundreds of thousands of products or more and physically retrieving and picking up products that the customer intends to purchase. The customer then transports those products through the retail store to a point-of-sale system where the customer physically purchases the intended product.

BRIEF DESCRIPTION OF THE DRAWINGS

Disclosed herein are embodiments of systems, apparatuses and methods pertaining to identifying products a customer intends to be purchase through image processing. This description includes drawings, wherein.

Figure 1:
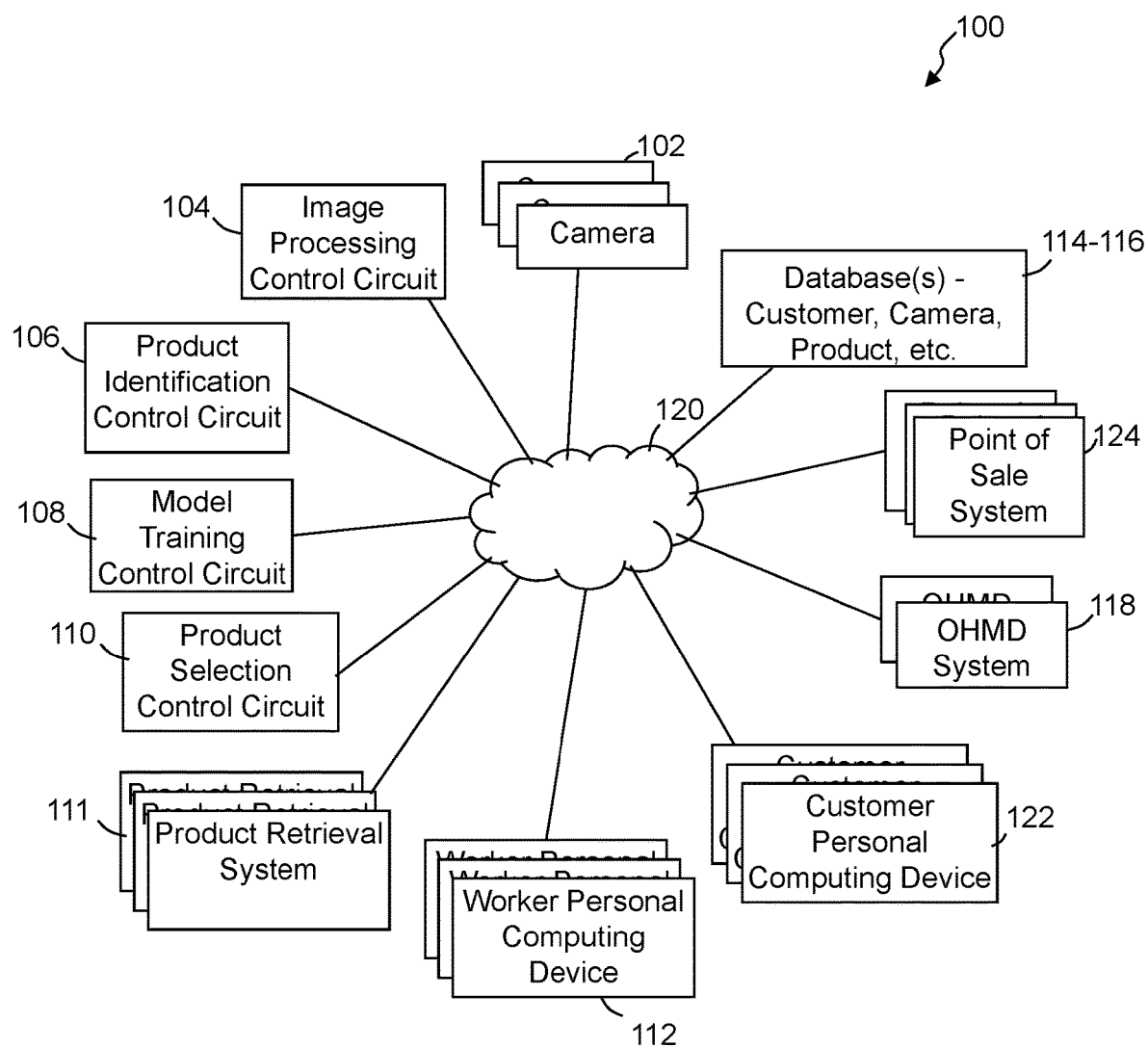
FIG. 1 illustrates a simplified block diagram of an exemplary product identification system that in part can be implemented to support customers that are physically in a retail store, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Generally speaking, pursuant to various embodiments, systems, apparatuses and methods are provided herein useful to assist handicapped individuals and others in identifying products the individual intends to purchase without the individual having to physical retrieve or touch the products. In some embodiments, systems are provided to support handicapped customers and other customers in a retail store. Some of these systems can include a plurality of cameras that are positioned and distributed along one or both sides of each aisle of multiple aisles of a retail store associated with a retailer. Each camera can be oriented to capture images (e.g., still images, video content, etc.) of customers in and moving along a respective one of the multiple aisles. An image processing control circuit can be communicatively coupled with each of the plurality of cameras, and/or communicatively coupled with one or more databases or other memory that store the images to access the images. The image processing control circuit is configured to access and apply a set of customer field of view rules to process the images from each of the plurality of cameras, and determine, based on multiple images from a set of multiple cameras of the plurality of cameras, a customer field of view of a customer of interest within a field of view of one or more of the cameras of the set of the multiple cameras. Some embodiments include a product identification control circuit that is configured to access and apply a set of product identification rules to identify, based on product location information, a set of multiple products within the identified customer field of view, assign a viewing probability to each product of the set of the multiple products as a function of a distance from a determined center of the customer field of view, and identify a first product of the set of the multiple products that the customer is considering purchasing, without the customer having to touch or pick up the first product, as a function of the viewing probability and a customer purchase history.

A product selection control circuit can be included in some embodiments and is configured to access and apply a set of product selection and/or prediction rules to determine a purchase probability that the first product is a product the customer intends to purchase as a function of the purchase history associated with the customer and without the customer having to touch or pick up the first product. The first product can be added to a virtual electronic cart as a purchase set of one or more products that the customer is predicted to intend to purchase when the purchase probability of the first product exceeds a purchase probability threshold. In some embodiments, instructions can be communicated to a worker personal computing device to control the worker personal computing device to instruct a worker of the retail store, when the purchase probability of the first product exceeds the purchase probability threshold, to retrieve the first product for purchase by the customer and to be supplied to the customer.

Further, some embodiments provide methods of supporting handicapped customers and/or other customers in a retail store. Some of these methods process, by an image processing control circuit, images from each of a plurality of cameras. In some implementations, the plurality of cameras are positioned and distributed along one or both sides of each aisle of multiple aisles of a retail store associated with a retailer. Typically, each camera of the plurality of cameras is oriented to capture images of customers moving along a respective one of the multiple aisles. The methods can further apply a set of customer field of view rules and determine, based on multiple images from a set of multiple cameras of the plurality of cameras, a customer field of view of a customer within a field of view of one or more of the cameras of the set of the multiple cameras. A set of multiple products within the identified customer field of view can be identified, by a product identification control circuit, based on product location information. Some embodiments assign a viewing probability to each product of the set of the multiple products as a function of a distance from a determined center of the customer field of view, identify a first product of the set of the multiple products that the customer is considering purchasing, without the customer having to touch or pick up the first product, as a function of the viewing probability and a customer purchase history. Further, a purchase probability that the first product is a product the customer intends to purchase can be determined, by a product selection control circuit, as a function of the purchase history associated with the customer and without the customer having to touch or pick up the first product. The first product can be added to a virtual electronic cart as a purchase set of one or more products that the customer is predicted to intend to purchase when the purchase probability of the first product exceeds a purchase probability threshold. Some embodiments communicate instructions to a worker personal computing device and control the worker personal computing device to instruct a worker to retrieve the first product for purchase by the customer and to be supplied to the customer.

FIG. 1 illustrates a simplified block diagram of an exemplary product identification system 100 that in part can be implemented to support handicapped customers, customers carrying children, customer's that cannot reach an product of interest, and/or other customers that are physically in a retail store associated with a retailer, in accordance with some embodiments. The product identification system 100 includes a plurality of cameras 102 distributed throughout a retail store, one or more image processing control circuits 104 and/or systems, one or more a product identification control circuits 106 and/or systems. In some embodiments, the product identification system 100 further includes one or more model training control circuits 108 and/or systems, one or more a product selection control circuits 110 and/or systems, one or more product retrieval systems 111, one or more worker personal computing devices 112 (e.g., smart phone, tablet, RFID tag scanning system, bar code scanning system, retail store specific portable device, etc.), and one or more databases, such as one or more of a customer database 114, a camera database 115, and a product database 116. Some embodiments may optionally include one or more optical head mounted display (OHMD) systems 118 (e.g., augmented reality glasses, Google GLASS, HOLOLENS, VUZIX M300, LUMUS BLADE, MOVERIO, VUE, etc.) that can be utilized by customers as input to the system in at least predicting products that the respective customer intends to purchase.

The product identification system 100 further includes one or more computer and/or communication networks 120 (e.g., LAN, WAN, WI-FI, BLUETOOTH, cellular, etc.) that enable direct and/or indirect communication coupling between one or more of the control circuits, devices, databases, and/or other systems and components of the product identification system 100. For example, in some embodiments, the image processing control circuits 104 are communicatively coupled with the cameras 102 through one or more distributed wired and/or wireless communication and/or compute networks 120, and/or communicatively coupled with the one or more camera databases 115 to access the images and/or video content captured by the cameras. The product identification control circuits 106, in some embodiments, is communicatively coupled through the one or more networks 120 with one or more of the image processing control circuits 104, the model training control circuit 108, the product selection control circuit 110, the worker personal computing devices 112 and the databases 114-116. Further, the one or more computer and/or communication networks 120 enable some of all of the control circuits and/or databases to be local at a particular retail store, remote from the retail store, distributed over multiple different systems that are communicatively coupled over the one or more networks, or a combination thereof. For example, one or more of the image processing control circuit 104, the product identification control circuit 106, the model training control circuit 108, the a product selection control circuit 110, the databases 114-116 and/or other components may be implemented through multiple servers, computers and/or other such systems to enable distributed processing and/or redundancy, which can improve system computational processing capabilities, provide greater system control and upgrading, while further enhancing reliability through redundancy.

Figure 2:
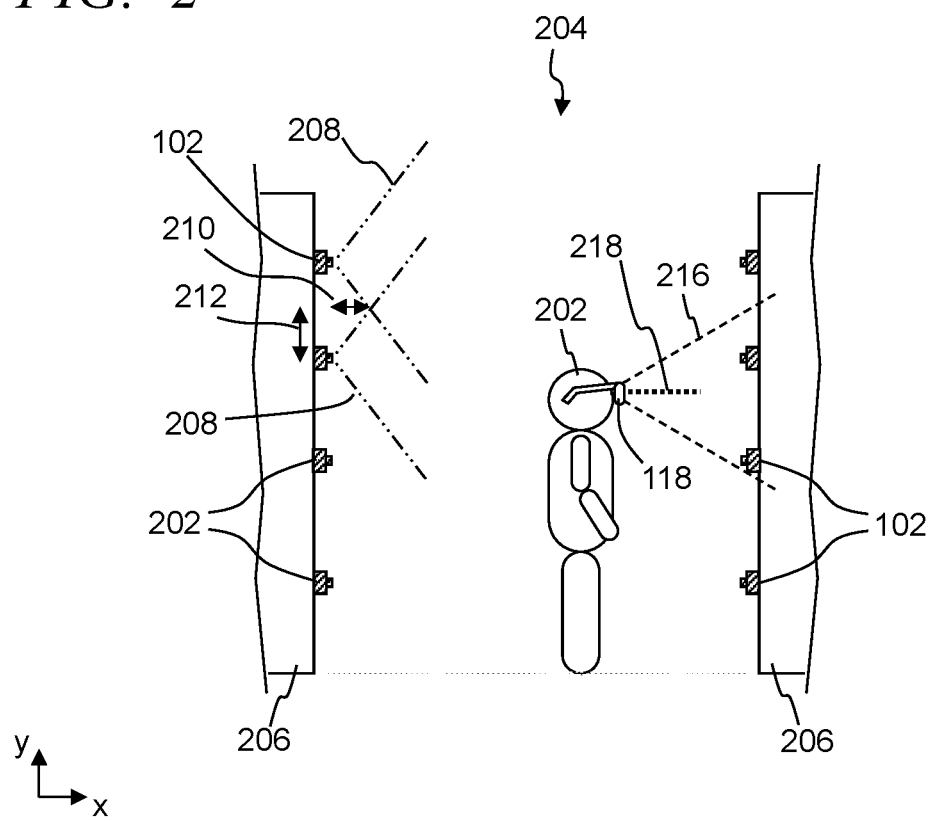
FIG. 2 illustrates a simplified side view of an exemplary customer in an exemplary aisle of a retail store, in accordance with some embodiments.
Figure 3:
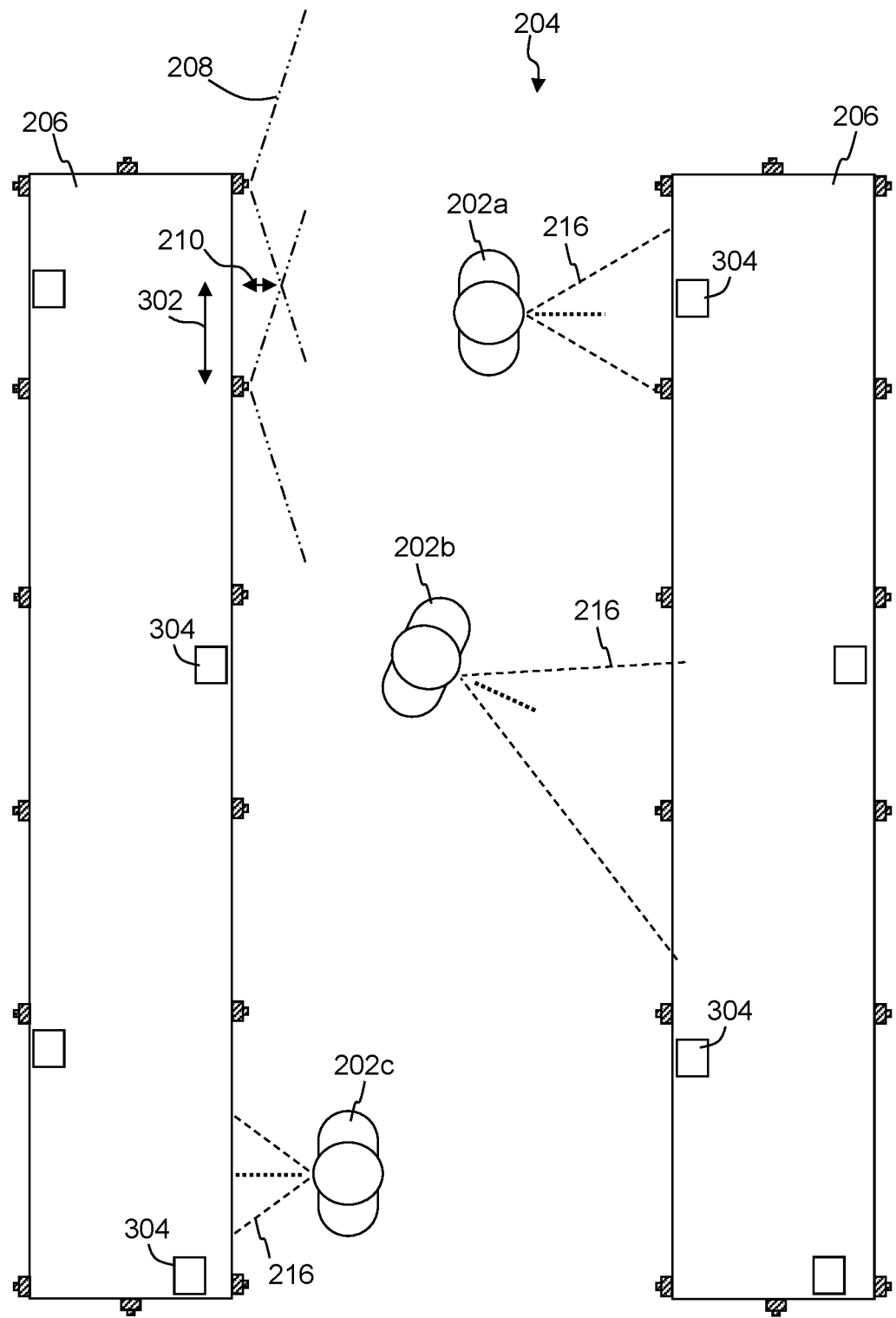
FIG. 3 illustrates a simplified overhead view of at least a portion of the exemplary aisle of a retail store with multiple customers moving along the aisle while shopping for products, in accordance with some embodiments.

FIG. 2 illustrates a simplified side view of an exemplary customer 202 in an exemplary aisle 204 of a retail store, in accordance with some embodiments. FIG. 3 illustrates a simplified overhead view of at least a portion of the exemplary aisle 204 of a retail store with multiple customers 202*a-c* moving along the aisle while shopping for products, in accordance with some embodiments. Referring to FIGS. 1-3, a plurality of cameras 102 are distributed along one or both sides of one or more aisles 204, and typically each aisle and other shopping areas where products are placed for access by at least the customers (and in some instances limited to access by workers of the retail store). Each camera of the plurality of cameras is typically oriented to capture images of customers 202 moving along a respective one of the multiple aisles or other areas of the retail store. Some embodiments include one or more additional sensor systems 304 that can be used to provide sensor information to one or more of the image processing control circuit 104, product identification control circuit 106, model training control circuit 108, product selection control circuit 110, product retrieval systems 111, worker personal computing device 112, optical head mounted display systems 118, customer personal computing device 122 (e.g., smart phone, tablet, laptop, etc.), point of sale systems 124, and/or other such systems. Examples of sensors can include but are not limited to one or more of distance measurement sensors, motion sensors, RFID tag readers, distance sensors, WI-FI tracking and/or triangulation sensors, cellular signal tracking and/or triangulation sensors, optical-based scanning sensor systems to sense and read optical patterns (e.g., bar codes), radio frequency identification (RFID) tag reader sensor systems, and/or other such sensor systems. The sensors can be utilized, for example, to identify a location of a customer 202 and/or track locations of a customer moving through the retail store. For example, an RFID tag carried or moved by the customer 202 can be tracked over time and/or WI-FI signal from a customer portable computing device can be tracked over time and used to track the customer location as the customer moves through the retail store. Distance measurement systems can be further used to identify and/or more precisely identify a location of a customer (e.g., use the distance measurements in cooperation with other tracking information).

The cameras 102 may be fixed on the shelving units 206, racks, modulars and/or other structures that support products to be visible to customers while the customers shop in the retail store. (For simplicity, the below description refers to shelving units 206, while it will be appreciated that the description applies equally to other relevant structures positioned in retail stores that can support cameras, support products, and/or are structures positioned relative to where customers consider products for purchase.) Additionally or alternatively, one or more cameras 102 can be positioned at the ceiling, on the floor, supported by other structures (e.g., posts, pillars, beams, etc.), and/or otherwise positioned to capture images (e.g., still images, video content, etc.) of customers 202 as the customers move through the aisles of the retail store.

The cameras 102 are typically distributed along the length of the aisle or other shopping area of the retail store, and/or distributed vertically. The number of cameras and the distance or spacing apart and/or separation between cameras can depend on many factors, such as the number of products supported by the shelving unit 206 or other product support structure, sizes of products expected to be supported by the shelving unit, predicted amount of customer traffic along the aisle or shopping area, the potential distance customers can be away from the cameras, predicted heights of customers' eyes, level of accuracy desired, quality of the cameras used and/or other such characteristics of the camera, other such parameters, and typically a combination of two or more of such factors. Some embodiments provide numbers of cameras and distances between cameras to ensure overlapping camera fields of view (FOV) 208 of the cameras at threshold distances away from 210 (x-axis), vertically from 212 (y-axis), and/or to the sides of 302 (z-axis) the camera.

Further, some embodiments enable cameras to be added or removed from an area of the retail store as product location is changed over time. In such embodiments, for example, camera mountings may be provided that enable cameras to be readily attached and detached. Still other embodiments additionally or alternatively include movement control systems that control the movement of one or more cameras horizontally along an aisle and/or vertically. This enables one or more cameras to move along with a particular customer as the customer moves along the aisle and/or to be adjusted to height of a customer's eyes or other relevant height that provides a desired orientation of the camera field of view relative to the customer and/or the customer's field of view.

Still referring to FIGS. 1-3, the one or more image processing control circuits 104 can communicatively couple with each of the plurality of cameras 102 and/or are communicatively coupled with a memory storage device (e.g., an image database or repository) configured to receive the images captured by the one or more cameras. Accessing the images, the one or more image processing control circuits 104 apply in real time one or more image processing rules in processing the images from each of the plurality of cameras. In some embodiments, one or more sensors (motion sensors, RFID tag readers, distance sensors, WI-FI tracking and/or triangulation sensors, cellular signal tracking and/or triangulation sensors, etc.) are included in the aisles and other shopping areas to detect customers and/or movement and relevant ones of the one or more image processing control circuits 104 are activated to process images from cameras that are within a threshold distance of the one or more sensors detecting the movement and/or customers. Additionally or alternatively, some embodiments initially process images at a first rate and/or at a minimal evaluation threshold to determine whether there is movement and/or a customer, and one or more image processing control circuits 104 can transition to processing images at a faster rate and/or with more precision processing in response to detecting the customer and/or movement. Similarly, the processing of images can be continued until movement is no longer detected. Still further, some embodiments track the movement of customers through the retail store by processing images and/or video processing, RFID tracking, bar code tracking, WI-FI signal tracking, cellular tracking, and/or other such tracking. Based on the tracked movement and known mapping of the cameras 102 relative to the store layout and/or product locations, the images of relevant cameras that correspond to the tracked movement of the customers (e.g., within a threshold distance of the customer based on movement rate, based on detected movement, based on recognition of a particular customer corresponding to previous images from other cameras, etc.) can be processed while other cameras are deactivated and/or images are not processed or processed at a reduced rate.

Typically, a limited subset of the plurality of cameras 102 can capture images of a single customer 202 at a given time. For example, a set of multiple cameras 102 of the plurality of cameras may be capturing effective images of a customer that can accurately be evaluated in real time to determine at least an orientation of the customer relative to potential products placed proximate those cameras. The cameras can include cameras on one or both sides of the aisle, whether positioned in front of, behind, to the side of, above and/or below the customer. In some embodiments, the image processing control circuit applies one or more of the image processing rules to evaluate multiple images from the set of multiple cameras, and based on the multiple images from the set of multiple cameras, the image processing control circuit determines a customer field of view 216 (FOV) of a customer 202 within a camera field of view 208 of one or more of the cameras of the set of the multiple cameras. Typically, the customer field of view 216 is determined in three-dimensions (x, y and z coordinates). Some embodiments use well known common dimensions of fields of view of typical humans (e.g., between ages 30-50), while in other instances, the system may use knowledge of the customer (e.g., customer's age) to determine a common dimension of a field of view, while in still other instances, the system may use more detailed knowledge of the customer when known (e.g., based on eye tests, based on historic viewing and/or purchases, etc., for the identified customer). In some embodiments, the cameras operate at rates of 30 images per second and the image processing control circuits evaluate the images to identify images having a threshold resolution and/or threshold clarity that they can be used to further evaluate the customer in the images. As such, the image processing is at rates that are much faster than can be performed by a human. Similarly, processing of images from different cameras from different orientations relative to the customer enable the system to identify an orientation of the customer and a field of view in real time.

In some applications, the image processing control circuit 104 determines, in real time and based on the application of the image processing rules in image processing of multiple images from one or more, and typically at least two or more of the set of multiple cameras, a head orientation of a head of the customer and a facial orientation of a face of the customer. In some embodiments, predefined facial characteristics, head characteristics, and/or body characteristics are identified and used to identify an orientation (e.g., identification of different parts of an ear with the different parts detected indicating an orientation, detecting hair lines, detecting parts of the mouth, detecting parts of the nose, detecting parts of a single eye, detecting parts of both eyes, detecting parts of one or both eyebrows, other such characteristics, a general shape of the head, whether shoulders are detected, an angle of shoulders, waist positioning relative to shoulder positioning, or a combination of two or more of such characteristics). Some embodiments define the head orientation and/or facial orientation in a two-dimensional mapping, a three-dimensional mapping (x, y, z) that identifies the location and directional orientation of the head and/or face, a six-dimensional mapping (e.g., with the mapping of the head location in three dimensions (x, y, z), and the angle/tilt of the head and/or face using three angles (e.g., roll, pitch, yaw)), other such mapping, or a combination of two or more of such mapping. Using the head orientation and/or the facial orientation, the image processing control circuit can determine the customer field of view as a function of the head orientation and the facial orientation. The image processing control circuit 104, in some embodiments, can further additionally or alternatively utilize the images to track eye movement of the customer over time. The customer field of view 216 of the customer can be determined as a function of the tracked eye movement over time and/or the movement of the customer field of view 216 can be tracked based at least in part on the tracked eye movements.

As described above, some embodiments utilize one or more optical head mounted display systems 118 to obtain eye movement information of respective customers. The optical head mounted display systems 118 may be supplied by the retail store or may be supplied by the customer. The image processing control circuit 104 can be further configured to communicatively coupled with the one or more optical head mounted display systems 118, which may be at least temporarily associated with a particular customer (e.g., when supplied by the retail store). The optical head mounted display can provide customer eye movement to the image processing control circuit and be utilized to identify a location of the customer field of view 216 relative to products. Location information and/or other information may be provided by the optical head mounted display, other cameras 102, other tracking systems and/or sensors, or a combination of two or more of such sources. Similarly, the eye tracking information and/or location information from the optical head mounted display may further be used to determine the orientation of the customer, location of the customer within the retail store, and/or other such determinations.

The image processing control circuit 104 can receive or otherwise access the eye tracking information from the optical head mounted display system. Further, in some applications, the image processing control circuit, in determining the customer field of view of the customer, is configured to determine the customer field of view 216 based on at least the eye tracking information.

In some embodiments, the image processing control circuit and/or separate processing system applies one or more of the image processing rules to determine a reliability confidence of each camera of the set of multiple cameras being used to determine the customer's field of view and/or in identifying one or more products that customer is interested in purchasing. The image processing control circuit 104, in determining the reliability confidence of each camera of the set of multiple cameras, is configured to identify an orientation of a particular customer relative to a camera field of view 208 of each of the cameras of the set of multiple cameras. A reliability confidence is assigned by the image processing control circuit to each camera as a function of the orientation of the customer relative to the corresponding camera field of view 208. For example, camera that is behind the customer typically has a lower confidence value because images from that camera cannot capture a customer's face and eyes, and thus eye orientation and/or face orientation is more difficult to determine from the images from this camera. Alternatively, a camera that is directly oriented toward the customer's face is likely to capture images that include the eyes and an orientation of the eye positioning relative to the field of view of the camera is typically more accurately determined. As such, this camera facing the customer is given a higher confidence value than the confidence value of the camera behind the customer. It is noted, however, that the camera behind the customer can help in determining an orientation of the customer based on an orientation of the head and/or face of the customer. Thus, in some embodiments, the image processing control circuit utilized images from the set of multiple cameras, while applying a reliability confidence to the different images based on the camera capturing the images.

Some embodiments utilize a process that identifies multiple predefined points on the head and/or body of the customer in determining an orientation of the customer and/or the customer's field of view. These points may additionally or alternatively be used to determine a confidence. Typically, the human field of view is about 180 degrees vertically and about 120 degrees horizontally. An angle of a customer's head can be determined. This angle can, in some applications be determined for each relevant camera that is considered. A pose estimation can be performed, which in some embodiments is implemented through machine deep learning. For example, a pose estimation may at least partially be implemented as described in the website nanonets.com/blog/human-pose-estimation-2d-guide. Coordinates of different predefined points of the human body can be identified.

The reliability confidence, in some embodiments, evaluates the number of predefined points of a human pose and/or specific subset of the points from an image or images to define the reliability confidence of a particular camera capturing the image or images. The confidence to each camera for a particular customer at any given time can be proportional to the number of predefined set of points of human pose relevant to identifying a customer's orientation and/or orientation of a customer's field of view relative to an orientation of a camera's field of view. For example, the predefined set of points may be specific to the head and shoulders, while other implementations may consider a set of points corresponding to the upper body that are covered in the camera's field of view. Accordingly, a camera that captures images that include more of the relevant set of points typically has a higher confidence. Additionally, some embodiments take into consideration of a distance the camera is to the customer. As such, the reliability confidence may be proportional to a distance from the customer. A closer camera typically captures more details. For example, a distance multiplier may be applied that adjusts the reliability confidence as a function of the distance between the camera and the customer. In some instances, a higher reliability confidence can be defined for a camera that is closer to the customer. Similarly, the camera capabilities (e.g., resolution, frame rate, number of pixels, age, etc.) can similarly be taken into account in determining a reliability confidence. So that the camera where the customer is covered with a higher number of pixels may be assigned a higher confidence.

In some embodiments an angle of the customer's head is identified based on an angle of a reference center line of the head relative to a reference line extending through the shoulders of the customer. A reference center line may be determined, in some applications, by defining a line extending through a center point between the customer's two eyes and/or a center point of the customer's lips. The angle of the head can be defined by the angle between the face reference center line of the customer's face and the shoulder reference line extending across points on both of the customer's shoulders two lines, where one line is the line formed by joining the center of the eyes and lips. This determined angle can be equated to a determined angle or tilt of the customer's head relative to a reference, such as the ground, which is typically parallel with a horizontal reference of the image data captured by the cameras. Some embodiments determine a center line and/or center point of the neck from one or more images captured by a respective camera. The center line or center point of the neck, in some implementations, is determine at least in part through a three dimensional (3D) reconstruction algorithms (e.g., similar to that described in docs.opencv.org/2.4/modules/calib3d/doc/camera_calibration_and_3d_reconstruction.html).

Further, the system typically also identifies cameras that capture images of at least a portion of the customer's face and uses images from one or more of these cameras to determine eye positions and the customer's field of view in identifying a set of one or more products the customer is considering. In some embodiments, the images are evaluated to identify a center of each eye ball of the customer through techniques similar to pose estimation and/or through the identification of predefined points of the face and eye. A plane joining or extending through the two centers of the two eyes of the customer and extending away from the customer toward the products is determined by the system based in part on the angle of the head relative to the reference (e.g., the ground) and the center points of the two eyes. A center 218 of the customer field of view, point of gaze or focus point of the customer's gazed is expected to lie on a line perpendicular to and intersecting the plane passing through both the centers of the customer's eye, with the perpendicular line at a center point along the perpendicular plane corresponding to a center point between the customer's eyes, with the customer's field of view dependent on the center or gaze point of the customer field of view, a distance from the products and at least a portion of an expected angle of vision (e.g., about 180 degrees vertically and about 120 degrees horizontally for some customers, while narrow for other customers, such as older customers, customers' with known angles of vision, etc.).

The set of one or more products that are within a threshold distance of the determined center of the customer field of view or point of gaze, and within the customer's field of view can be identified based on a mapping of the retail store and a corresponding mapping of products within the mapping of the retail store. Typically, the product mapping is a three-dimensional mapping with X, Y and Z coordinates relative to a reference point or multiple different reference points (e.g., a store reference point, and a shelf reference point). The products that are within the threshold distance of the point of gaze can be identified and some embodiments further apply probabilities to those products in attempting to predict the one or more products that the customer actually desires to purchase. Some embodiments apply priorities and/or a probability distribution based on how close a given product is to the point of gaze. For example, some implementations assign a higher probability to those products closest to the point of gaze and decreased probabilities the further from the point of gaze, and typically dependent on the distance from the point of gaze. Some applications apply a gaussian distribution and/or a bell curve to probability with a mean at the point of gaze having a highest probability, and probability decreasing further from the point of gaze. Some embodiments further evaluate timing or a duration of how long a customer's field of view is maintained and/or within a threshold distance variation. A threshold gaze duration may be applied to identify when a customer is actually considering a product for purchase instead of more generally considering products. Still further, many embodiments consider product preferences, shopping and/or purchase histories, customer's preferences for products on sale or otherwise discounted, customer partiality vectors relative to product vectorized characterizations, other such factors, and typically a combination of such factors. In some embodiments, the system determines a customer field of view based on the head and/or face orientation to narrow down on a field of view. Further, some embodiments additionally or alternatively track eye movements to identify a customer field of view. The use of the eye tracking can, in some embodiments, be utilized in cooperation with the determined field of view based on the head and/or facial orientation, which can be performed in parallel or sequentially with the determination of the field of view based on the head and/or facial orientation. For example, the eye tracking can be used to refine the identified point of gaze and/or the field of view based on the field of view determined based on the head and/or facial orientation.

Further, in some embodiments, the image processing control circuit 104 and/or another system of the product identification system 100 is configured to identify a customer for which the system is identifying products predicted that the customer wants to purchase. This identification can be through facial recognition, detecting of a customer personal computing device 122 being carried by the customer (e.g., identified through a WI-FI connection), a communication from an application (APP) on the computing device, the customer scanning a customer and/or rewards card, the customer signing in through a kiosk and/or an APP, other such methods, or a combination of two or more of such methods. In some embodiments, the image processing control circuit 104 or a separate facial recognition system further applies one or more rules of a set of image recognition rules to identify facial features of the customer from one or more images obtained from one or more of the cameras 102 (e.g., from at least one of the set of the multiple cameras), and identify the customer within a respective aisle of the multiple aisles based at least on the facial features.

Once identified, the system can continue to track the customer. A customer profile associated with the customer can be accessed or obtained. For example, a customer profile can be accessed through the customer database 114. The customer profile can include customer name, a customer number or other customer identifying information, age, gender, occupation, image information that may be used for facial recognition, payment information, billing address, one or more shopping lists, product preferences, customer partiality vectors, purchase history information, address information, delivery information, other such information, or a combination of two or more of such information. Some embodiments may further maintain previous image and/or video content corresponding to particular customer's while in the retail store, or at least image information comprising details about such image and/or video content (e.g., location within the retail store, time and/or date, duration of time a customer considered one or more products, product or products considered during the duration time(s), whether the customer returned and reconsidered one or more products, and/or other such information). Additionally, some implementations may further correlate previous decisions by the customer to buy or not to buy a particular product to the relevant image and/or video content and/or image information (e.g., the customer gazed at a particular type of product for determined duration but still did not purchase the product). Some embodiments use this information to identify customer specific patterns (e.g., some customers may decide to purchase expensive items in very less time as compared to others), and such patterns can be used to evaluate a particular customer's considerations of products in identifying whether to add a product to a virtual cart.

In some implementations, the image processing control circuit 104 determines the customer field of view 216 based on the orientations of each camera 102 of the set of the multiple cameras, the fields of view of each camera of the set of the multiple cameras, and/or the reliability confidences of each camera of the set of the multiple cameras. Typically, the databases include a camera mapping of the cameras relative to the retail store. This camera mapping can be a two-dimensional mapping, a three-dimensional mapping that identifies the location and directional orientation of each of the plurality of cameras 102, a six-dimensional mapping (e.g., with the mapping of the camera location in three dimensions (x, y, z), and the angle/tilt of the camera specific using three angles (e.g., roll, pitch, yaw)), other such mapping, or a combination of two or more of such mapping. The same camera mapping or a separate mapping, in some implementations, further includes a mapping of a field of view of each camera, which may be generated based on specifications of the camera, tests, evaluations of images from the cameras, other such methods, or a combination of two or more of such methods. The orientations of the cameras can in part be used to identify a location of the customer and an orientation of the customer. The camera field of view mapping of the cameras similarly can be used to determine the location of the customer as well as identifying aspects of the customer used to determine a positional orientation of the customer relative to the respective camera, and/or determine a reliability confidence relative to that camera. Similarly, other embodiments determine the orientation of the customer field of view of the customer utilizing the orientations of each camera of the set of the multiple cameras, the fields of view of each camera of the set of the multiple cameras, the reliability confidences of each camera of the set of the multiple cameras and the eye tracking information relative to a location of the customer.

The image processing control circuit, in some embodiments, processes images of the customer to identify the orientation of the customer relative to the camera and/or the camera field of view 208, and to define the reliability confidence for the images from that camera. The multiple images are further processed based on the reliability confidence to determine a customer field of view 216 for the customer. In some applications an orientation of a face of the customer is determined from images from two or more cameras, and a resulting face orientation is determined as a function of the reliability confidence of each of those cameras. For example, a weighted average orientation may be determined by weighting each orientation from a different camera, and an average may be determined (e.g., lower confidence results in a lower effect on the determined orientation). Some embodiments apply the reliability confidence after confirming that the differences in determined orientation are more than a threshold difference. The determination of the customer field of view 216 is determined in a similar fashion based on images that include the face of the customer. Similarly, the orientation of the face is typically utilized as a factor in determining an orientation of the customer field of view 216 (e.g., defining a maximum range of the potential field of view).

The product identification control circuit 106, which is typically communicatively coupled with the product database 116 and/or the image processing control circuit 104, is configured to identify one or more products that customer is considering purchasing. A product mapping of the locations of products within the retail store can be accessed through the product database 116 or other information. Using the product mapping the product identification control circuit 106 can apply one or more product identification rules to identify, based on product location information, a set of multiple products within the identified customer field of view 216.

Figure 4:
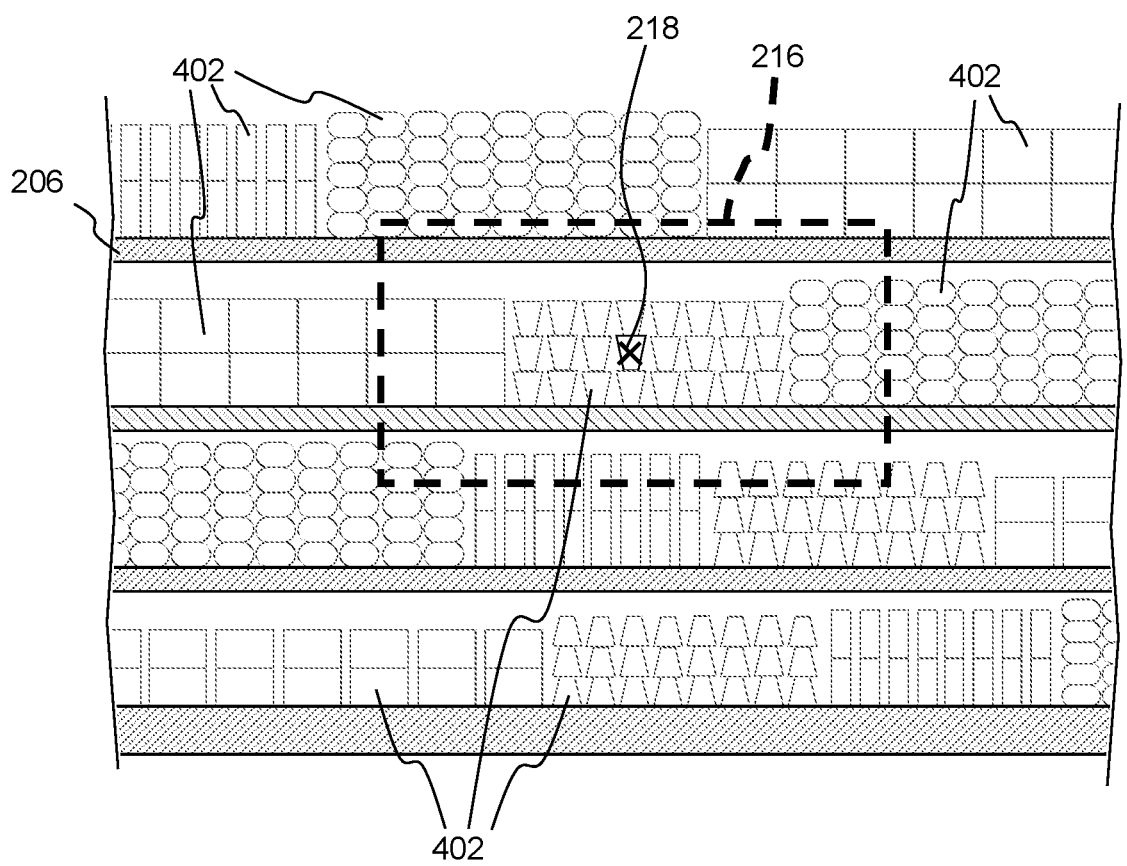
FIG. 4 illustrates a simplified plane view of exemplary products on a portion of an exemplary shelving unit and further illustrates dimensions of an exemplary customer field of view of a customer, in accordance with some embodiments.

FIG. 4 illustrates a simplified plane view of exemplary products 402 on a portion of an exemplary shelving unit 206 and further illustrates dimensions of an exemplary customer field of view 216 of a customer, in accordance with some embodiments. The dimensions of a customer field of view 216 at the products 402 is proportional to a distance between the customer and the products at the time of evaluating the products relative to the customer field of view. Referring to FIGS. 1-4, the product identification control circuit 106 utilizes the determined customer field of view 216 and applies one or more product identification rules to identify, based on product location information and/or image processing of products identified to be within the customer field of view, a set of multiple products within the identified customer field of view 216. In some embodiments, one or more products may be excluded when a boundary of the customer field of view extends over a portion of the product. As such, the set of multiple products may be limited to those products that are fully within the customer field of view. For each product in the set of identified product, the product identification control circuit 106 can apply one or more of the set of product identification rules and assign a viewing probability to each product of the set of the multiple products as a function of a distance from a determined center 218 of the customer field of view. In some embodiments, the viewing probability is linearly proportional to the distance from the center 218 of the customer field of view 216, with the products further from the center 218 having a lower viewing probability. Additionally or alternatively, the viewing probability may be dependent on a number of products between a product being considered and the center 218 of the customer field of view 216. In other embodiments, the viewing probability is exponentially reduced further from the center 218 of the customer field of view 216. Still other embodiments may apply a statistical evaluation to the products relative to the dimensions of the field of view (e.g., excluding products that are a more than two standard deviations of the number of products from a center 218 of the field of view).

The product identification control circuit 106 can use the viewing probabilities of the set of products to identify one or more products of interest from the set of the multiple products that the customer is considering purchasing without the customer having to touch or pick up any of the one or more product of interest. For example, those products having a viewing probability that has a predefined relationship with a viewing probability threshold may be identified as a product of interest. The viewing probability threshold may be a predefined threshold, may be determined over time, and/or modified over time. Some embodiments apply a probability model to the set of products to identify the one or more products of interest, and the modeling may be trained and/or adjusted over time based on feedback of products that are actually purchased by the customer from previous identifications of one or more products of interest.

In some embodiments, the product identification control circuit 106 further accesses the customer database 114 and obtains a purchase history by the customer being considered. In applying one or more of the product identification rules, the product identification control circuit 106 can use the viewing probabilities of the set of products in cooperation with customer profile information (e.g., purchase history, previously determined viewing probabilities in relation to previous purchases, customer preferences, customer partiality vectors, other such information, and typically a combination of two or more of such information) to further identify the one or more products of interest from the set of the multiple products that the customer is considering purchasing without the customer having to touch or pick up any of the one or more product of interest. Accordingly, without the customer having to physically touch, pickup or otherwise contact a product, the product identification system 100 can identify one or more products of interest as a function of the viewing probabilities for the products of the set of products within the customer field of view and the customer profile information (e.g., a customer purchase history, etc.). Again, some embodiments apply a probability model to the set of multiple products within the customer field of view to identify the one or more products of interest. The modeling may be trained and/or adjusted over time based on feedback of products that were actually purchased by the customer in previous shopping experiences relative products identified as one or more products of interest during those previous shopping experiences.

The image processing control circuit 104, in some embodiments, applies one or more rules to evaluate one or more images, or a sequence of images or video content, in identifying a set a field of view that is to be further evaluated. The evaluation can be implemented to identify a duration a customer maintained a field of view in a relatively stable location or within a threshold region. The duration can be used to distinguish different sets of products that are of interest versus sets of products that are briefly considered and less likely to be considered for actual purchase. One or more threshold gaze durations may be predefined or determined based on a customer's past history that can be used to exclude views by the customer that do not correspond with considerations for purchase and/or intentions to purchase. In some implementations, the threshold gaze duration can be a global duration for all products. Different threshold gaze durations, however, can be defined and/or determined for a single customer. For example, different threshold gaze durations can be defined based on a type of product being considered (e.g., different grocery threshold gaze durations for different groceries types of products), expensive products (e.g., products having a price greater than a price threshold, which may be different for different customers depending on historic purchases by the different customers, etc.) may be associated with a different expensive threshold gaze duration, one-time-purchase products (e.g., furniture, appliances, etc.) may have still another one-time threshold gaze duration, and the like. Again, the different threshold gaze durations may be predefined, may be determined over time based on feedback to the system upon evaluation of gaze times of a particular customer and subsequent actual purchases and/or non-purchases, and/or other such factors. Such modifications over time improves the accuracy of the results while greatly reducing processing time, reduced memory storage, and other computational benefits to the system.

Additionally or alternatively, in some embodiments, the image processing control circuit 104 can process images and/or sequences of images (e.g., video content) to identify customer emotions and/or movements that correspond with customer intentions. Again, such emotions can be used to distinguish when a customer is considering products for purchase versus merely looking at products to find a product of interest and/or merely scanning products without an intent to purchase. In some applications, the emotions may be identified through the detection of one or more facial expressions, a detected change from a facial expression, a change between two known facial expressions or a series of facial expressions, obtain estimated emotions of the customer based on facial expressions occurring within a respective facial expression threshold time of a respective threshold duration of the gaze of the customer on a particular product or set of products, obtain body language data occurring within a body language threshold time of a threshold duration of the gaze of the customer on the product or set of products, other such indicators, or a combination of two or more of such indicators. Using these indicators, the image processing control circuit can selectively exclude some periods of time where it is predicted that customer is not interested in products, and distinguish those periods of time from times when the customer is considering products for purchase. Distinguishing between such periods reduces computation processing overhead, frees up computational resources, reduces network traffic, reduces memory use, improves the speed of the system, and provides other advantages.

The product selection control circuit 110, in some embodiments, is communicatively coupled with the product identification control circuit 106 or memory storing information determined by the product identification control circuit (e.g., location of field of view, the set of products within a field of view, products of interest, and/or other such information). Based on the identified one or more products of interest, the product selection control circuit 110 can determine a purchase probability of each of the one or more potential products of interest without the customer having to touch or pick up the first product. The purchase probability corresponds to a predicted likelihood that the product is a product the customer actually intends to purchase. In some embodiments, the purchase probability is determined as a function of the purchase history associated with the customer. Some embodiments utilize additional information, such as but not limited to shopping lists, previously purchased quantities of that product, date of the previous purchase of that product, predicted rate of consumption based on historic rate of purchase and corresponding historic quantities of purchase, customer preferences, customer partiality vectors relative to product vectorized characterizations, other such information, or a combination of two or more of such information.

In some implementations, one or more models or purchase probability models are trained over time based on historic purchases, previous identifications of products identified as predicted to be purchased, feedback regarding whether those predicted products were actual purchased, other such information, and typically a combination of two or more of such information and other information. The model can be implemented through machine learning systems that adjust and modify the parameters considered and the results obtained over time based on feedback relative to the customer, and in some instances other customers (e.g., customers that have some relationship to the customer of interest, identification that a customer is part of a class of customers, and the like). Further, the product selection control circuit 110, in determining the purchase probability that the customer intends to purchase a particular product identified as being of interest, may further obtain and/or consider a duration of a gaze of the customer on the product, obtain estimated emotions of the customer based on facial expressions occurring within a threshold time of the duration of the gaze of the customer on the product, obtains body language data occurring within a threshold time of the duration of the gaze of the customer on the product, other such factors, or a combination of two or more of such factors. In some instances, the body language can include the customer touching the product, picking up the product (e.g., reviewing the contents and/or nutritional information), or other such actions relative to the product. Other body language may include a positioning of the head, a positioning of the customer's shoulders, hand and/or arm movements, head movements, other such body language, or a combination of two or more of such body language. Similarly, some embodiments may detect audio from the customer and utilize the audio as part of a determination of the probability the customer intends to purchase the product. The purchase probability can then be determined as a function of the purchase history associated with the customer, the duration of the gaze, the estimated emotions, the body language, other such factors or a combination of two or more of such factors.

The product selection control circuit 110 further evaluates the purchase probability of the product relative to a purchase probability threshold to determine whether the purchase probability exceeds the purchase probability threshold, or has another predefined relationship to the purchase probability threshold. The purchase probability threshold can be predefined. In other implementations, however, one or more models can be applied that can define and/or adjust the purchase probability threshold over time. Further, in some embodiments, the purchase probability threshold can be specific for a particular product and determined based on historic purchases relative to an identification of a product as intended to be purchased without the customer having to physically touch or handle the product. The product selection control circuit 110 further adds the identified product to a virtual electronic cart corresponding to the specific customer as a purchase set of one or more products that the customer is predicted to intend to purchase when the purchase probability exceeds to the purchase probability threshold. In some embodiments, the product selection control circuit 110 further determines a quantity of the product (e.g., number of the product, weight of the product, size of the product, etc.) predicted to be purchased by the customer. This quantity determination may be based, at least in part, on the purchase history of the customer. In some implementations, the quantity is determined based one or more of previously purchased quantities of that product, date of at least a most recent purchase of that product, predicted rate of consumption based on historic rate of purchase and corresponding historic quantities of purchase, and/or other such factors. Additionally or alternatively, the quantity may be determined based on past behavior of other customers that have been identified as being similar to the customer being considered (e.g., similar purchase histories, similar preferences, similar customer partiality vectors, etc.).

In some implementations, the product selection control circuit 110 communicates instructions to one or more workers, robots, automated retrieval systems and/or other such systems to retrieve the product for purchase by the customer and to be supplied to the customer. For example, instructions can be communicated to one or more worker personal computing devices 112 and control the worker personal computing device to instruct a corresponding worker to retrieve the product for purchase by the customer and to be supplied to the customer. Additionally or alternatively, one or more instructions can be communicated to one or more product retrieval systems 111 (e.g., a robot, an automated product retrieval system, one or more other such systems), or a combination of two or more of the worker and/or automated retrieval systems to control such systems to retrieve the products predicted that the customer intends to purchase. The product retrieval system 111 can include one or more mobile robotic systems, conveyor systems, mechanical arms, end effectors, lift systems, bin movement systems, automated forklift systems, other such systems, or a combination of two or more of such systems. Further, the instruction to the worker, robot, automated retrieval system or the like can further identify the determined quantity of the product and control the worker personal computing device to instruct the worker to retrieve the quantity of the product for purchase by the customer. The instruction to the worker can be a visual instruction displayed on a display screen of the worker computing device, through an audio instruction played back through the worker computing device, displayed through one or more displays positioned throughout the retail store, printed and provided to the worker, other such methods, or a combination of two or more of such methods. Similarly, the instruction to a robot or automated retrieval system can include instructions to control the operation and/or motion of these systems to move to a known storage location of the identified product and control the retrieval of the instructed quantity of the product. Further, the instructions can control the retrieval system to move the retrieved products to a location to be prepared for supplying the products to the customer, whether at the retail store or through delivery to a remote delivery location.

Further, in some embodiments, the worker can be instructed to transport the one or more products to the customer as the customer is approaching an exit area of the retail store (e.g., based on continued tracking the customer location) or to the customer's vehicle. The customer is typically further given an opportunity to reject one or more of the products identified, to request other replacement products, and/or request additional products that were not identified by the system. In some embodiments, the customer may be notified through a customer personal computing device 122 of each product identified and automatically added to the virtual electronic cart and the quantity of the product. The customer can review that information at any time and implement changes was the customer is shopping and/or at the time of completing the purchase. For example, the customer may access a graphical user interface displayed through a software application on the customer computing device 122 identifying the product, the quantity, pricing, and/or other relevant information. In some embodiments, the product selection control circuit can further control one or more point-of-sale systems 124 to charge the customer for the products in the electronic cart and receive payment through a predefined method of payment or a method provided by the customer. In other embodiments, the products are not provided to the customer as the customer is leaving the retail store, and instead are queued to be delivered to the customer.

In some embodiments, the image processing control circuit 104 determines the cameras that are capturing sufficient part of a customer's face, head and/or body. By processing images from these cameras, a customer field of view can be identified based on a determined orientation of the customer and the customer's face. The product identification control circuit 106 can determine which products are within the customer field of view, and based on this set of viewed products identify one or more products that the customer is predicted to want to purchase. Some embodiments determine a viewing probability of two or more of the products within the field of view. This viewing probability may be based on a duration the customer looks at the products, a stability of the customer field of view, body language, a position of a product with the field of view, and/or other such information.

Figure 5:
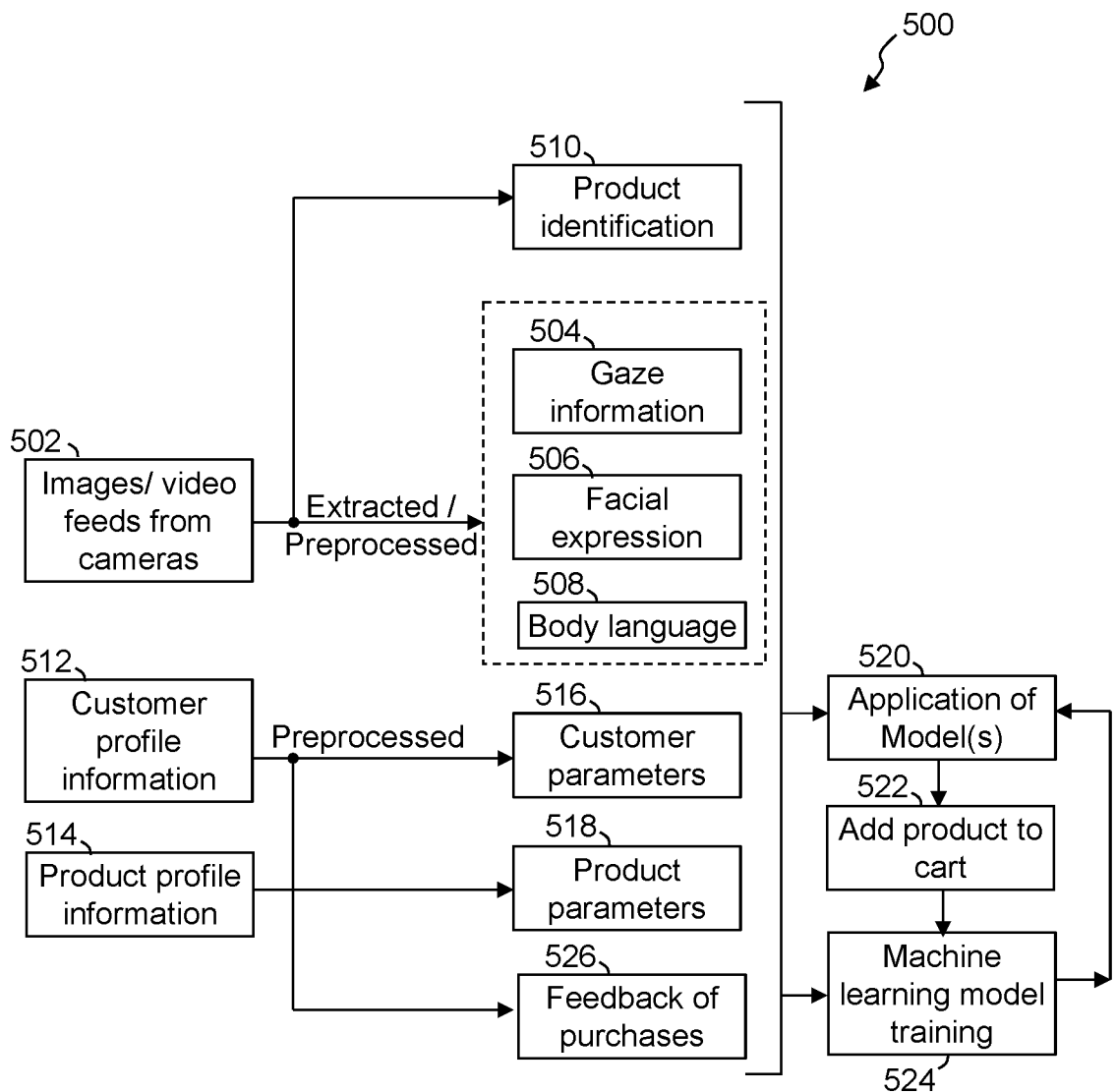
FIG. 5 illustrates a simplified functional diagram of an exemplary product identification system, in accordance with some embodiments.

FIG. 5 illustrates a simplified functional diagram of an exemplary product identification system 500, in accordance with some embodiments. The system receives images 502 as input. The images can be processed by the image processing system to identify customers, identify gaze information 504 (e.g., customer field of view, gaze duration, etc.), facial features and/or expressions 506, body language information 508, other information, and typically a combination of two or more of such image information. The product identification control circuit utilizes the relevant image information to identify a set of one or more products 510 within the customer field of view and determine a relative viewing probability. Customer profile information 512 and/or product profile information 514 can be accessed in some embodiments as input. Some embodiments apply a processing to the customer profile information and/or product profile information to extract relevant portions of the customer profile information 516 and/or the relevant portions of the product profile information 518 to be used in determining whether to add a virtual product to the cart. The one or more models are applied 520 to the information to make the binary determination of whether to add the product to the virtual cart 522. Some embodiments subsequently implement model training 524 utilizing the input data in cooperation with the subsequent purchase information 526 to enhance the models and improve training of the models to achieve more accurate results based on the feedback to the system from purchased and/or non-purchased products. Generally speaking, there are various known approaches to training and subsequently improving the training of knowledge-based models using sets of parameters (e.g., known locations and/or dimensions of camera fields of view, product placement, customer purchase histories, customer preferences, other such parameters or combination of two or more of such parameters) and feedback information, and the present teachings are not overly sensitive to any particular selections in these regards.

Some embodiments apply a broader or liberal purchase probability, purchase probability threshold and/or viewing probability threshold to enable the system to add a product to a virtual cart based on one or more other products previously added to the virtual cart and a relationship the product has with those one or more other products, and/or to subsequently reevaluate a product based on a relationship that product has with one or more products subsequently added to the cart. For example, a products for which the purchase probability or the viewing probability is less than a corresponding thresholds, but with a margin of the respective threshold, may be added to the virtual cart based on other products previously identified as intended to be purchased and in the virtual cart of the customer, and/or the product can be later added based on the relationship with subsequent products added to the virtual cart. As a further example, a purchase history of an identified customer (or other similar customers) may indicate that the particular customer generally purchases both bread and butter together. Bread may not initially be added to the virtual cart when the customer was in the breads section of the retail store (e.g., due to a lack of detection of a threshold purchase probability, or the like), but had a purchase probability within a margin of error, or other such margin. The system can maintain this information and continue to evaluate subsequent products added to the virtual cart (e.g., track until the customer checks out). The system can subsequently add the identified bread upon detecting that the customer reached the butter section and the system detects (e.g., based on the customer's viewing angle and facial expressions) that the customer intends to buy butter and butter is added to the cart. Based on the identified relationship between the two products, the system can add a product that was not previously added to the virtual cart (e.g., the bread can be added after adding the butter). Similarly, the system may subsequently remove a product added to the virtual cart based on a lack of the addition of other products to the cart having a threshold relationship. For example, bread may be added by the system to the virtual cart based on exceeding a threshold, but later identify that the customer is not interested in buying butter. The system may remove the bread based on the lack of correlation with one or more other products that are in the cart and/or products that were not added to the cart. Again, the purchase history can be evaluated to identify the correlation between products.

Figure 6:
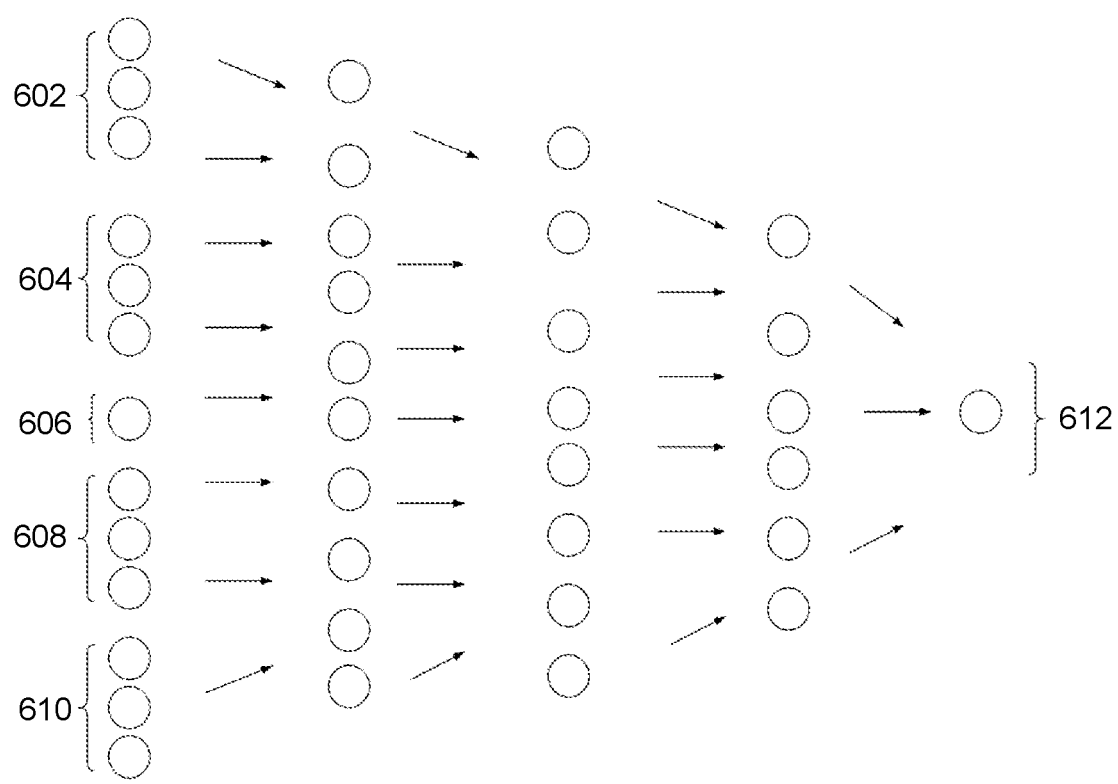
FIG. 6 illustrates a simplified functional diagram of an exemplary trained model applying filtering rules to determine whether an identified product is to be virtually included in a virtual electronic cart, in accordance with some embodiments.

Some embodiments include a model training control circuit 108 that obtains and applies values for parameters, feedback, updates and other relevant information to continuously train and update the model. Further, in some implementations, a single model is implemented for all customers, with modeling being specific to a particular customer based on parameters specific to that customer. In other implementations, multiple different models may be used, and a customer may be categorized and associated with the model corresponding to that categorization (e.g., categorized based on types of products typically purchased, quantities of products purchased, location, preferences, and/or other such factors). FIG. 6 illustrates a simplified functional diagram of an exemplary trained model applying filtering rules to determine whether an identified product is to be virtually included in a virtual electronic cart, in accordance with some embodiments. For example, image processing data 602, 604 and/or the recorded images and/or video content from one or more cameras can be received, a determined length or duration of a gaze 606 on a particular product can be received, customer profile information 608 (e.g., purchase history, preferences, customer partiality vectors, etc.) can be received, product profile information 610 (e.g., size, weight, nutritional information, ingredients, price, discount information when available, product vectorized characterizations, etc.) can be received, other such information. The modeling applies the rules to the various inputs to provide a binary output decision 612 of whether the product should virtually be included in virtual electronic cart. Some embodiments implement at least the modeling through one or more neural networks, convolutional neural networks, recurring neural networks, or a combination of two or more of such networks that are configured to cooperatively operate. Further, the neural network or networks applied may vary over time based on feedback of the actual purchases relative to the predicted products virtually placed in the virtual electronic cart.

The image processing control circuit can be configured to identify from the images captured by the set of multiple camera one or more of: customer's emotions, customer's body language, any interactions with a product, customer's gaze data, and/or other such information. Further, in some applications, the model may receive as input recordings of each of the cameras capturing images of the customer while the customer is gazing at products, and/or an identification of products within a customer field of view provided by the image processing control circuit and product identification control circuit. Other inputs can include a length or duration of a gaze of the customer at the set of products, customer profile information, product profile information, other such information, and typically a combination of two or more of such information. In some embodiments, the output of the model is a binary value that indicates whether the product should be added to virtual cart. In some instances, a purchase probability may additionally be outputted.

Figure 7:
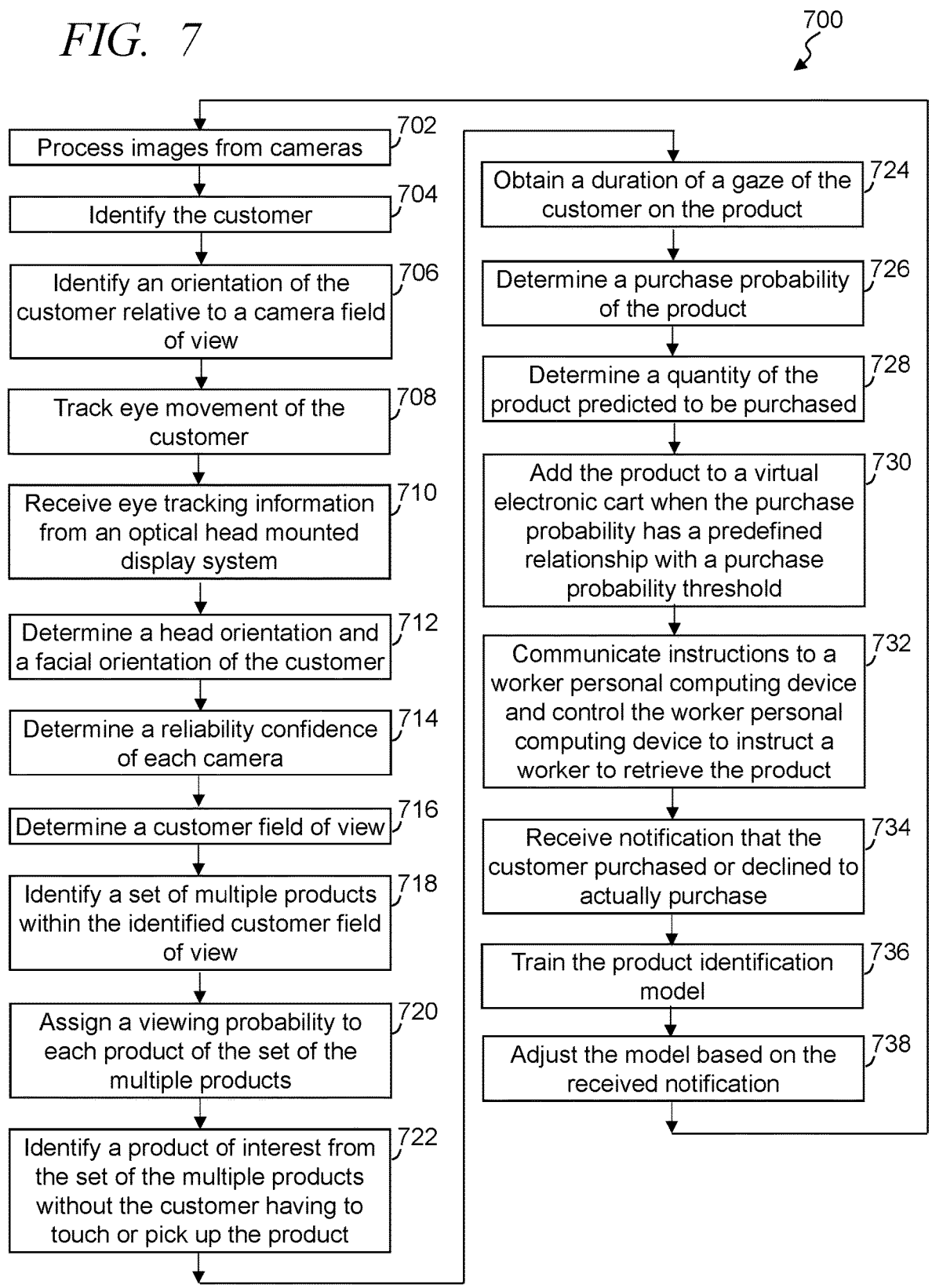
FIG. 7 illustrates a simplified flow diagram of an exemplary process of supporting handicapped customers, customers with their hand full, customers carrying children and other customer in a retail store to identify products without the customer having to physically pick up or otherwise handle the product, in accordance with some embodiments.

FIG. 7 illustrates a simplified flow diagram of an exemplary process 700 of supporting handicapped customers, customers with their hand full, customers carrying children and other customer in a retail store to identify products without the customer having to physically pick up or otherwise handle the produce, in accordance with some embodiments. In step 702, images from each of a plurality of cameras 102 are processed by one or more image processing control circuit 104. The plurality of cameras are positioned and distributed throughout the retail store associated with a retailer (e.g., individual retail store, retailer with multiple store locations, a retailer with a chain of multiple retail store, etc.). The cameras are positioned to capture images of customers in sales areas as the customers view and consider products offered for sale at the retail store. For example, in some implementations, cameras are positioned along one or both sides of each aisle of multiple aisles of a retail store associated with the retailer. Further, each camera of the plurality of cameras is typically oriented to capture images of customers moving along a respective one of the multiple aisles. Some embodiments include step 704 where a customer that is shopping in the retail store is identified. In some embodiments, facial features of the customer are identified from one or more images from one or more cameras, and the customer is identified. This can include identifying the customer as the customer enters the retail store and track the customer, identify the customer within a respective aisle of the multiple aisles based at least on the facial features, or other such identification. Similarly, the customer can continue to be identified over time to confirm the identification of the customer and/or as at least part of track the customer as the customer moves through the store. Other methods of identifying the customer can additionally or alternatively be utilized. For example, some embodiments detect of a customer personal computing device 122 being carried by the customer (e.g., identified through a WI-FI connection), a communication from an application (APP) on the computing device, the customer scanning a customer and/or rewards card, the customer signing in through a kiosk and/or an APP, other such methods, or a combination of two or more of such methods.

Some embodiments include optional step 706, where an orientation of the customer is identified relative to one or more of a camera field of view of each of the cameras of the set of multiple cameras, a shelving unit 206, a product, an endcap, and/or other such orientation. The process 700, in some implementations, includes step 708 where eye movement of the customer is track over time. In some embodiments, the eye movement is determined based on image processing to identify the iris and/or pupil within the image of the customer and changes in location of the iris and/or pupil, changes in amount the sclera detected, changes in the location of the iris and/or pupil relative to the sclera detected, other such techniques, or a combination of two or more of such techniques. Similarly, some embodiments use head orientation, changes in head orientation, rate of change of head orientation, amount of change of head orientation, other movements of one or more body parts, or a combination of two or more of such techniques. Further, some embodiments include optional step 710 where eye tracking information is received from an optical head mounted display system 118, augmented reality glasses or other such system that is at least temporarily associated with the customer. Some embodiments optionally include step 712 where a head orientation of a head of the customer and/or a facial orientation of a face of the customer is determined based on image processing of the multiple images from the set of multiple cameras.

In step 714, a reliability confidence is determined for each camera of the set of multiple cameras being used to determine the customer's field of view and/or in identifying one or more products that the customer is interested in purchasing. The image processing control circuit 104, in determining the reliability confidence of each camera of the set of multiple cameras, for at least some applications, is configured to identify an orientation of a particular customer relative to a camera field of view 208 and/or orientation of a camera field of view of each of the cameras of the set of multiple cameras. The reliability confidence can, in some embodiments, be assigned to each camera as a function of a distance the relevant camera is to the customer, the orientation of the customer relative to the corresponding camera field of view 208, the head and/or facial orientation relative to a field of view of the camera, a number of pixels in an image occupied by the customer, other such factors, and typically a combination of such factors. The head orientation and/or facial orientation can, in some applications, be utilized in assigning the reliability confidence of each camera as a function of the orientation of the customer relative to the corresponding camera field of view. Additionally or alternatively, the reliability confidence can be proportional to the number of predefined set of points of human pose identified in images captured by the camera of a customer of interest.

In step 716, a customer field of view 216 of the customer of interest, within a camera field of view 208 of one or more of the cameras 102 of the set of the multiple cameras, is determined based on one or more images from a set of one or more cameras of the plurality of cameras. In some embodiments, the determination of the customer's field of view includes tracking eye movement of the customer over time and determining the field of view of the customer as a function of the tracked eye movement over time. The eye movement may be identified from images captured by cameras 102 and/or from information received from an optical head mounted display system 118. Some embodiments identify when the eye movement and/or a point of gaze remains relatively stable or remains within a threshold variation of distance of an initial determination of a center of the customer field of view for more than a gaze threshold period of time to identify the customer is considering one or more products of interest. In some embodiments, a head orientation of a head of the customer, a facial orientation of a face of the customer and/or eye positioning of the customer can be determined based on image processing of the multiple images from the set of multiple cameras. The customer field of view may be determined as a function of the head orientation, the facial orientation and/or eye positioning of the customer. Additionally or alternatively, some embodiments consider the camera reliability confidence and determine the customer field of view of the customer of interest based on orientations of each camera of the set of the multiple cameras, the fields of view of each camera of the set of the multiple cameras, the reliability confidences of each camera of the set of the multiple cameras and eye tracking information relative to a location of the customer. Some embodiments consider the camera reliability confidence of multiple cameras in selecting images from cameras having at least a threshold reliability confidence and/or selecting one or more cameras having highest reliability confidences. The images from the selected cameras can be used to determine the customer field of view.

In step 718, the product identification control circuit 106 identifies a set of one or more products within the identified customer field of view based on product location information. The set of products typically is also dependent on a distance the customer is from the products, rate of movement of the customer's eyes, and other such factors. In step 720, a viewing probability is assigned to each product of the set of the multiple products as a function of a distance from a determined center of the customer field of view. Some embodiments further access a customer profile associated with the customer based on the identification of the customer, and access the customer purchase history through the customer profile associated with the customer. The viewing probability can further be defined as a function of the customer purchase history with increased probability being applied to those products previously purchased. Similarly, rates of consumption and previous purchase dates can be considered in determining the viewing probability as a function of a likelihood of a customer's intent to replenish a previously purchased product.

In step 722, one or more products of the set of the multiple products is identified based on product identification, prediction and/or selection rules that the customer is considering purchasing, without the customer having to touch or pick up the product, as a function of the viewing probability and a customer purchase history. Some embodiments include step 724, where a duration of a gaze of the customer on the product is obtained, estimated emotions of the customer are obtained (e.g., based on facial expressions occurring within a threshold time of the duration of the gaze of the customer on the product), and/or body language data occurring within a second threshold time of the duration of the gaze of the customer on the product are obtained.

In step 726, a purchase probability that the product is a product the customer intends to purchase is determined, by applying a set of one or more probability rules, as a function of the purchase history associated with the customer and without the customer having to touch or pick up the product. In some embodiments, the determination of the purchase probability further includes obtaining a duration of a gaze of the customer on the product, obtaining estimated emotions of the customer based on facial expressions occurring within a threshold time of the duration of the gaze of the customer on the product, obtaining body language data occurring within a second threshold time of the duration of the gaze of the customer on the product, and determining the purchase probability as a function of the purchase history associated with the customer, the duration of the gaze, the estimated emotions, and the body language. In some implementations, the purchase probability that the customer intends to purchase the product can include determining the purchase probability as a function of the purchase history associated with the customer, the duration of the gaze, the estimated emotions, and the body language. Some embodiments include step 728 to determine a quantity of the product predicted to be purchased by the customer based on the purchase history of the customer. The determined quantity can be dependent on purchase history (e.g., quantity typically purchased, time since last purchase, etc.), an estimated rate of consumption, a notification of total consumption, a quantity identified in a shopping list, other such factors, or a combination of such factors.

In step 730, the product identified as intended to be purchased by the customer is added to a virtual electronic cart as a purchase set of one or more products that the customer is predicted to intend to purchase. Typically, the product is added to the virtual electronic cart when the purchase probability of the product exceeds a purchase probability threshold. The purchase probability threshold, in some implementations, is learned over time and modified over time based on feedback of actual purchases relative to earlier products predicted to be purchased. In step 732, instructions are communicated to a worker personal computing device 112 the worker personal computing device is controlled based on the instructions to instruct a worker to retrieve the product for purchase by the customer, communicated to one or more product retrieval systems 111, or a combination of one or more worker personal computing devices and product retrieval systems 111, and to be supplied to the customer. In some embodiments, it is identified when the customer intends to leave the store and/or is approaching an exit, and the products may be provided to the customer. In other instances, the one or more products identified as products the customer intends to purchase are queued to be delivered to a delivery location associated with the customer.

In step 734, a notification can be provided as feedback (e.g., from a point-of-sale system). This notification can specify that the customer purchased or declined to actually purchase the product predicted that the customer would purchase. Some embodiments include step 736 where a product identification model is trained and/or modified over time based on continued feedback corresponding to products actually purchased and/or not purchased relative to detected gaze durations, thresholds and the like. In step 738, the model is adjusted relative to the customer based at least on the received notification and the purchase probability of the product. The training is typically repeated over time any number of times, to continue to make adjustments to thresholds, parameters, probabilities, and the like. Similarly, some or all of the steps of the process 700 can be repeated. Typically, the process 700 is repeated numerous times while the customer is in the retail store to identify multiple different products the customer intends to purchase without the customer having to touch or handle the products.

Figure 8:
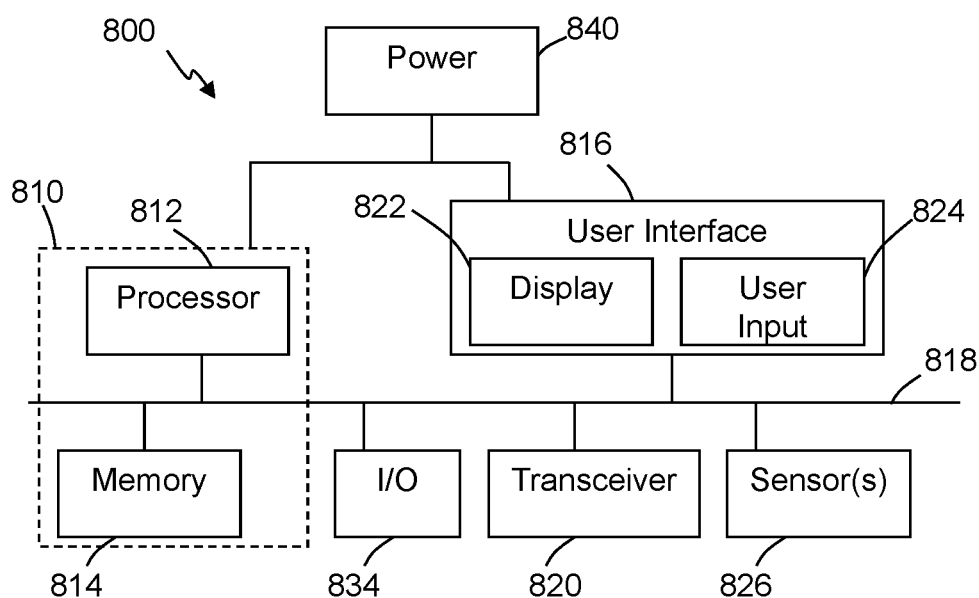
FIG. 8 illustrates an exemplary system for use in implementing methods, techniques, devices, apparatuses, systems, servers, sources and identify products intended to be purchased by customers, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 8 illustrates an exemplary system 800 that may be used for implementing any of the components, circuits, circuitry, systems, functionality, apparatuses, processes, or devices of the product identification system 100 of FIG. 1, and/or other above or below mentioned systems or devices, or parts of such circuits, circuitry, functionality, systems, apparatuses, processes, or devices. For example, the system 800 may be used to implement some or all of the cameras 102, image processing control circuit 104, product identification control circuit 106, model training control circuit 108, product selection control circuit 110, product retrieval systems 111, worker personal computing device 112, databases 114-116, optical head mounted display systems 118, customer personal computing device 122, point of sale systems 124, and/or other such components, circuitry, functionality and/or devices. However, the use of the system 800 or any portion thereof is certainly not required.

By way of example, the system 800 may comprise a control circuit or processor module 812, memory 814, and one or more communication links, paths, buses or the like 818. Some embodiments may include one or more user interfaces 816, and/or one or more internal and/or external power sources or supplies 840. The control circuit 812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 812 can be part of control circuitry and/or a control system 810, which may be implemented through one or more processors with access to one or more memory 814 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 800 may be used to implement one or more of the above or below, or parts of, components, circuits, systems, processes and the like.

The user interface 816 can allow a user to interact with the system 800 and receive information through the system. In some instances, the user interface 816 includes a display 822 and/or one or more user inputs 824, such as buttons, touch screen, track ball, keyboard, mouse, etc., which can be part of or wired or wirelessly coupled with the system 800. Typically, the system 800 further includes one or more communication interfaces, ports, transceivers 820 and the like allowing the system 800 to communicate over a communication bus, a distributed computer and/or communication network 120 (e.g., a local area network (LAN), the Internet, wide area network (WAN), etc.), communication link 818, other networks or communication channels with other devices and/or other such communications or combination of two or more of such communication methods. Further the transceiver 820 can be configured for wired, wireless, optical, fiber optical cable, satellite, or other such communication configurations or combinations of two or more of such communications. Some embodiments include one or more input/output (I/O) ports 834 that allow one or more devices to couple with the system 800. The I/O ports can be substantially any relevant port or combinations of ports, such as but not limited to USB, Ethernet, or other such ports. The I/O interface 834 can be configured to allow wired and/or wireless communication coupling to external components. For example, the I/O interface can provide wired communication and/or wireless communication (e.g., WI-FI, BLUETOOTH, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 826 to provide information to the system and/or sensor information that is communicated to another component, such as the image processing control circuit 104, product identification control circuit 106, model training control circuit 108, product selection control circuit 110, product retrieval systems 111, worker personal computing device 112, optical head mounted display systems 118, customer personal computing device 122, point of sale systems 124, and/or other such systems. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, distance measurement sensor systems, wireless communication sensor systems (e.g., cellular, WI-FI or other wireless communications), wireless signal location triangulation sensor systems (e.g., identify a location of a customer personal computing device, worker personal computing device and/or other such systems), other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 800 comprises an example of a control and/or processor-based system with the control circuit 812. Again, the control circuit 812 can be implemented through one or more processors, controllers, central processing units, logic, software and the like. Further, in some implementations the control circuit 812 may provide multiprocessor functionality.

The memory 814, which can be accessed by the control circuit 812, typically includes one or more processor-readable and/or computer-readable media accessed by at least the control circuit 812, and can include volatile and/or nonvolatile media, such as RAM, ROM, EEPROM, flash memory and/or other memory technology. Further, the memory 814 is shown as internal to the control system 810; however, the memory 814 can be internal, external or a combination of internal and external memory. Similarly, some or all of the memory 814 can be internal, external or a combination of internal and external memory of the control circuit 812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 120. The memory 814 can store code, software, executables, scripts, data, content, lists, programming, programs, log or history data, user information, customer information, product information, and the like. While FIG. 8 illustrates the various components being coupled together via a bus, it is understood that the various components may actually be coupled to the control circuit and/or one or more other components directly.

Some embodiments track customers, customers' position and/or orientation and/or customer's eye movements using cameras 102, optical head mounted display systems, and/or other such relevant systems to locate one or more products the customer intends to purchase without the customer having to actually touch or handle the products. Based on this identification the product can be added to a virtual shopping cart and/or a worker, robot, automated robotic system, other such systems or a combination of two or more of such systems can be notified to retrieve the product on behalf of the customer. Accordingly, these embodiments implement a hands-free shopping solution for customers by tracking location, orientation and/or the movement of the customer's eyes relative to known product placement in the retail store. In some embodiments, the product identification system 100 detects a customer moving through the store. In some instances, the customer is detected as the customer enters the store, and the system tracks the customer and analyzes the movement of the customer's eyes. The system identifies products being viewed by the customer, and identifies products the customer intends to purchase. Some embodiments identify the products predicted to be purchased based in part on a duration of gaze, facial expressions, body language and/or other such information. Based on this information, the system predicts the customer's interest in purchasing the one or more products determined as being viewed by the customer. When the system identifies that the customer intends to purchase the product, the product is added to an e-cart associated with the customer (e.g., associated with the customer's online account). Some embodiments further communicates an instruction to one or more workers and/or one or more product retrieval systems to control systems to implement the gathering of products that have been placed in the e-cart. The collected products can be delivered to the customer as the customer leaves the retail store and/or is prepared for delivery at a remote delivery location associated with the customer and/or confirmed by the customer (e.g., a notification of one or more products added to the virtual shopping cart can be communicated to the customer and the customer can confirm one or more of the products as intended to be purchased and/or the customer can specify a delivery location). Further, some embodiments enable the customer to accept or rejection the one or more products added to the virtual cart, and feedback is provided to the system to modify the model training to enable enhanced processing and subsequent identification of products the customer intends to purchase during later visits by the customer to the retail store or an associated retail store (e.g., another store of a chain of retail stores operated by a retail chain entity).

In some implementations, the product identification system 100 provides a next generation solution that, in part, simplifies shopping and brings at least some of the conveniences of online shopping experience to the in-store shopper. According to this solution, customers can just look/gaze at a product and purchase that product without having to pick the product up or having to handle a cart, basket or the like throughout the journey in the retail store. The product identification system 100, in some embodiments, tracks the eye movements of the customers using cameras 102 installed in the retail store, from augmented reality glasses and/or other sources. With cameras installed throughout at least those areas of the retail store traveled by customer, the customers and their movements in the retail store can be tracked. Some embodiments further track and/or utilize customers' past shopping and/or purchase histories to identify products that the customer is predicted to want to actually purchase. An e-cart can be maintained with respect to a particular customer where products identified are virtually added automatically after identifying products the system predicts the customer intents to purchase. In some instances, as part of a checkout experience, the customer receives the products together that were picked up on behalf of the customer, or otherwise delivered to the customer. As such, the product identification system provides a simplified and improved shopping experience through the identification of products and the control of systems to control the retrieval of products on behalf of the customer without the customer having to actually touch or handle the products.

Some embodiments record the eye movements of customers using cameras 102 in the retail store, optical head mounted display systems 118, and/or other sources, and associate it with that customer's respective buying patterns, preferences, partiality vectors, purchase histories, consumption rates, shopping lists and/or other such information associated with the respective customer using artificial intelligence and/or modeling. Upon identifying a customer at a retail store (e.g., through facial recognition, detecting a scan of a customer identifier (e.g., customer card, RFID tag, barcode, etc.), detecting a connection to a WI-FI network by the customer's personal computing device 122, etc.), the system determines and analyze the eye movements of the customer to determine a customer's field of view. Based on the customer field of view, a set of one or more products are identified that the customer is considering. The eye movement can include identifying a duration of the gaze, movement within a threshold distance, distance from products, and/or other such factors. Some embodiments further consider facial expressions, body language, potential emissions, historic product consideration history (e.g., historic gaze durations of products purchased and/or not purchased, historic rates of travel through the retail store and/or specific areas of the retail store, variations from history rates of movement, etc.). Based on this information in combination with historic purchases, product preferences, customer partiality vectors, rates of consumption, and the like, the system identifies one or more products predicted that the customer is interested in buying without the customer having to retrieve, pickup, handle or even touch the product. The identified product can be added to a virtual e-cart that is associated with the customer (e.g., the customer's profile, a customer's online account, a store account, etc.). Additionally, some embodiments autonomously identify a quantity of that product to be purchased based on one or more factors, such as purchase history, time since most recent purchase, previous quantities purchased, an estimated or known rate of consumption, notification of a need to replenish the product, a shopping list associated with the customer and/or other such information. The system can further communicate instructions to control an automated product retrieval system 111 and/or a worker personal computing device 112 to direct a worker to retrieve one or more products. The instructions can provide specific information about a location where the product can be retrieved, and/or identify specific aspects of an automated retrieval system to implement the retrieval (e.g., identify a specific robot system). Such product retrieval, in some implementations, may be performed in parallel with the customer shopping and the products delivered to the customer prior to or as the customer is leaving the retail store. In other instances, the collected set of one or more products can be prepared for delivery to a remote location.

In some embodiments, the product identification system 100 includes multiple cameras 102, which may be connected to one or more networks via wired and/or wirelessly communication (e.g., BLUETOOTH, WI-FI, cellular, etc.). These cameras can be installed on the shelves and/or racks that contain products for purchase in the store, ceiling, floor, beams, posts, columns and/or other relevant locations. The cameras can be focused on or directed towards average customer movement and/or position approximation within the retail store where customers are viewing and considering products for purchase. For example, some of the cameras may be is installed and directed and/or tilted in a way to capture images and/or video content of customers and other people moving in the aisles and around products. Additionally or alternatively, images and/or video content may be received from an optical head mounted display system (e.g., Augmented Reality (AR) glasses) worn by the customer and/or other customers (e.g., an AR glasses worn by a different customer capturing images of the customer of interest as the different customer is positioned near and/or moves by the customer of interest). One or more image processing systems can be locally implemented and/or remotely implemented (e.g., through one or more servers, which can improve operation, provide redundancy and enhanced reliability). Image data is communicated to the image processing system from a set of one or more cameras corresponding to a determined customer's current location within the retail store. A product identification system can use products identified based on a determined customer's field of view that the customer is interested in purchases, and instructions can be communicated to control a retrieval system 111 and/or a worker personal computing device 112 to cause the retrieval of the one or more products. Images, video content and/or other relevant data can be received from the cameras 102. Further, the three dimensional location of the cameras is known relative to a three dimensional mapping of the retail store. Some embodiments further know the three dimensional mapping of respective fields of view of the different cameras. Customer profiles are maintained and used by the system in determining which products that customer is interested in purchasing. Similarly, purchase history information can be used to identify products of interest. Other customer information may be maintained in customer profiles and used by the system, such as but not limited to data for face recognition, fingerprint recognition, etc. Typically, the system is implemented through multiple different processors located at different locations over a geographically distributed computer and/or communications network 120. Such processing systems can include a number of Graphical Processing Units (GPUs), Central Processing Units (CPUs), servers, local processing systems, other such processing systems, or a combination of two or more of such processing systems.

In an exemplary implementation, the system identifies a customer as the customer enters and/or travels through the retail store (e.g., at the entry the customer is identified and a membership identifier is linked with the customer's face and/or facial features). The identification can be done using membership card, face recognition, fingerprint recognition, etc. A virtual e-cart is accessed or created for the customer. In some instances, a previous e-cart may have been created (e.g., based on on-line shopping by the customer, a previous visit that was stored for subsequent visit, etc.). In some embodiments one or more workers may be assigned the responsibility of picking up the products from the e-cart as products are automatically identified on behalf of the customer based on customer viewing. The one or more workers can be granted access to view the e-cart on a mobile worker personal computing device. In some instances, the worker may further be granted access to view customer information (e.g., picture of the customer, customer preferences, a shopping list, price limits, budget information, preferences for sales items, etc.). For example, a worker can be notified of the assignment to the customer through a software application (APP) on mobile phone or other mobile device.

The system can track the customer as the customer moves through aisles looking at various products. The image content is evaluated to determine the eye gaze data of the customer, and identify products within the customer's field of view. In some applications, image data is continuously feed to the system, while in other instances, image data is restricted to predefined patterns, such as threshold slowing, a threshold stationary amount of time, and/or other such patterns. Using the customer's previous behavior (e.g., the previous gaze feeds, customer's facial expressions, customer's body language, along with the duration of the gaze at the respective product, purchase history, preferences, customer partiality vectors relative to product vectorized characterizations, other such information, or a combination of two or more of such information), the system identifies one or more products that satisfy a threshold probability that the customer intends to purchase and the one or more products are added to the e-cart of the customer.

A quantity of the product can be determined from the data analysis of the previous purchase history, purchases of similar members, and/or other such information. The system can control an automated retrieval system 111 and/or communicate instructions to control a worker personal computing device to instruct and direct the worker to picks the products added to the e-cart. The image processing and product selection can be repeated any number of times as the customer continues to move through the retail store. In some embodiments, as the customer approaches an exit, payment area, product retrieval area or other designated area, the worker and/or retrieval system can be notified and the products brought to the customer. The customer can similarly be notified of the products identified and/or at the time of leaving can be notified, and the customer is provided an opportunity to approve or decline the one or more products. Some embodiments further initiate an instant billing (e.g., through the APP on the worker personal computing device, a point of sale system, or other system) and an electronic invoice is sent to the customer. The customer can also make changes to the e-cart at that the time of preparing to leave or while shopping (e.g., through an APP on the customer personal computing device). When a customer makes some changes to the final products, this information is fed as a feedback to the training process which considers this new data upon subsequent visits by the customer.

Some embodiments identify customers as the customer enters and/or moves through the retail store. For example, the customer is identified as the customer is entering or arrives at the retail store through one or more of, but is not limited to, membership card (e.g., customer scans the membership card at the entrance, and images of the customer captured by one or more cameras proximate the entrance, are associated with the received customer identification, which may include associating customer's physical attributes like face, clothing, physique, hair, etc. with the customer identifier, which can help in subsequently identifying the customer from image content, other identification card (e.g., payment card, driver's license, etc.), etc.). A customer identifier can be obtained and a corresponding customer profile. Some embodiments additionally or alternatively utilize facial recognition when the system already has sufficient data to do facial recognition for the customers, and a unique membership identification corresponding to the face is identified. Other biometrics authentication may additionally or alternatively used, such as fingerprint, iris recognition, etc. to identify the customer. Other embodiments may use a QR code is generated on customer's phone APP, which contains information and validation regarding membership number. The customer identifier can be randomly generated, generated based on known information (e.g., driver's license, social security number, etc.), or otherwise defined.

Some embodiments utilize machine learning to predict whether a product should be added to the virtual cart of a particular customer. The machine learning, in some embodiments, utilizes precise map of the camera locations and orientation in the retail store, and product locations. Further, some embodiments, when evaluating image data define a reliability confidence of one or more cameras that are potentially considered when attempting to identify products the customer is considering and/or in predicting products the customer intends to purchase. In part, this reliability confidence provides a level of reliance on images from a particular camera. Similarly, some embodiments determine a viewing probability that the customer gazing a particular product. For a given camera facing the customer, which has a customer in its feed at a given point of time, the system can identify a direction of the gaze of the eyes of the customer, along with the face/head orientation. With this data, the system deduces the field of view of customer and identifies the products present in that customer field of view.

A viewing probability of those products being viewed can be assigned based on a relative location within the determined customer field of view. In some embodiments, products closer to the center or middle of the customer field of view are assigned higher probabilities of being gazed, with decreasing probability further from the center. Further, in some implementations, cameras capturing more of the face of the customer are typically assigned a higher reliability confidence. A camera that is behind the customer is typically assigned lower reliability confidence level since it has the customer's back view. In some instances, however, image data from a camera directed at the back of the customer may be used to determine viewing probabilities of the products as the field of view of the camera is more closely aligned with that of the customer's field of view. Images from different cameras can be processed. The reliability confidences of the different cameras are considered in identifying a customer field of view. Some embodiments formulate a collective probability distribution as a function of the customer gazing at products in an aisle. Further, some embodiments utilize optical head mounted display systems to track the eye movement of customers. The customers could be offered to wear Augmented Reality glasses at the entry of the retail store, which ease the tracking of eye movement and allows eye gestures, and may further enable voice input and output. The commands from eye gestures could be used to confirm addition of products to the virtual cart. Other sources for voice input can be provided such as microphones with or proximate the cameras 102, communications from the customer's personal computing device 122, and/or other such audio input.

Some embodiments further extract features used to evaluate a customer's intent of whether to purchase or not. Some of these features include, but are not limited to, the duration of the gaze, customer's facial expressions and/or emotions, body language (e.g., whenever a customer reads the contents of ingredients on food items he/she purchases the product 60% of the time), other such features, and typically a combination of such features. Some embodiments further consider attributes of products (e.g., a jewelry item might be inspected for longer than a grocery item by most customers, before purchasing), customer's attributes (e.g., some customers might be more inclined to purchase low cost items only), customer's past purchase history, including online and in-store purchases, other customers' data (e.g., identify other customers that behave similar to the current customer of interest), etc. Based on the extracted features but not limited to those mentioned above, and the fact that the product was purchased or not and in what quantities, a model is trained. The model, when provided the above attributes, then predicts whether the customer wants to buy an identified product or not, and the quantity.

Some embodiments further take into consideration a particular customer and/or customer purchase history in assigning a worker to pick products. A worker, from the available pool of associates, can be assigned a customer's virtual cart taking into consideration, for example, the data indication which associates might be closely associated with a particular customer and has higher probability of knowing the customer better, thus providing a more personalized experience. The worker can be notified on the mobile application that an e-cart has been assigned, and he/she goes to pick up the products. As the products are added to the e-cart, the associate may be notified of changes. In some instances, the worker picks products in almost parallel with the customer shopping or in a relatively small time gap. In other implementations, a single e-cart might be assigned to multiple workers to collectively retrieve products. Additionally or alternatively, the virtual e-cart may be shared with the customer (e.g., through an APP on the customer's smartphone), and the customer may make modifications to the virtual cart during the shopping experience. In some embodiments, the products are provided to the customer as the customer is leaving the retail store, and the products are charged to the customer through a method of payment. Often, a worker is assigned to multiple e-carts for multiple customers and/or assigned products from multiple different e-carts to retrieve. For example, the system may assign a worker to pick products that are physically close together for multiple different customers to optimize the worker bandwidth.

Some embodiments identify when a customer is finishing up and/or has finished shopping. For example, based on location information the system may identify that the customer is approaching or has reached an exit gate or is ready to receive the cart products. In some instances, the customer location is tracked throughout using indoor location tracking systems like beacons, WI-FI triangulation, customer and/or facial recognition, product RFID tag tracking, customer RFID tag tracking, other such methods, or a combination of two or more of such methods. As the customer approached or reaches an exit, pickup station, or the like, a worker can be notified. Additionally or alternatively, cameras on the exit/pickup station can be used to identify the customer and alert the worker. Further, the customer may use a membership card to indicate a desire to exit, may indicate through an APP on the customer's personal computing device, may enter an identification and notify the system through a kiosk, other such method or combination of two or more of such methods.

In some embodiments, when the customer reaches the exit or pickup station, the customer may be notified of the e-cart and provided the capability to edit the products. In some instances, for example, when the customer reaches the exit gate or pickup station, the worker provides the products and the customer removes products that are not wanted and/or requests other products. For example, if some products are missing, the customer makes a request to the worker to pick up those products. After customer's approval, the e-cart is checked out and billed.

In some embodiments, systems are provided to support customers in a retail store, comprising: a plurality of cameras positioned and distributed along both sides of each aisle of multiple aisles of a retail store associated with a retailer, wherein each camera of the plurality of cameras is oriented to capture images of customers moving along a respective one of the multiple aisles; an image processing control circuit communicatively coupled with each of the plurality of cameras, wherein the image processing control circuit is configured to process images from each of the plurality of cameras, and based on multiple images from a set of multiple cameras of the plurality of cameras determine a customer field of view of a first customer within a field of view of one or more of the cameras of the set of the multiple cameras; a product identification control circuit communicatively coupled with the image processing control circuit, wherein the product identification control circuit is configured to identify, based on product location information, a set of multiple products within the identified customer field of view, assign a viewing probability to each product of the set of the multiple products as a function of a distance from a determined center of the customer field of view and identify a first product of the set of the multiple products that the first customer is considering purchasing, without the first customer having to touch or pick up the first product, as a function of the viewing probability and a customer purchase history; a product selection control circuit communicatively coupled with the product identification control circuit, wherein the product selection control circuit is configured to: determine a purchase probability that the first product is a product the first customer intends to purchase as a function of the purchase history associated with the first customer and without the first customer having to touch or pick up the first product; add the first product to a virtual electronic cart as a purchase set of one or more products that the first customer is predicted to intend to purchase when the purchase probability of the first product exceeds a purchase probability threshold; and communicate instructions to a worker personal computing device and control the worker personal computing device to instruct a first worker to retrieve the first product for purchase by the first customer and to be supplied to the first customer.

Some embodiments provide methods of supporting customers in a retail store, comprising: processing, by an image processing control circuit, images from each of a plurality of cameras, wherein the plurality of cameras are positioned and distributed along both sides of each aisle of multiple aisles of a retail store associated with a retailer, wherein each camera of the plurality of cameras is oriented to capture images of customers moving along a respective one of the multiple aisles; determining, based on multiple images from a set of multiple cameras of the plurality of cameras, a customer field of view of a first customer within a field of view of one or more of the cameras of the set of the multiple cameras; identifying, by a product identification control circuit, a set of multiple products within the identified customer field of view based on product location information; assigning a viewing probability to each product of the set of the multiple products as a function of a distance from a determined center of the customer field of view; identifying a first product of the set of the multiple products that the first customer is considering purchasing, without the first customer having to touch or pick up the first product, as a function of the viewing probability and a customer purchase history; determining, by a product selection control circuit, a purchase probability that the first product is a product the first customer intends to purchase as a function of the purchase history associated with the first customer and without the first customer having to touch or pick up the first product; adding the first product to a virtual electronic cart as a purchase set of one or more products that the first customer is predicted to intend to purchase when the purchase probability of the first product exceeds a purchase probability threshold; and communicating instructions to a worker personal computing device and controlling the worker personal computing device to instruct a first worker to retrieve the first product for purchase by the first customer and to be supplied to the first customer.

The customer partiality vectors, their association with product vectorized characterizations, and the use of the correlations between customer partiality vectors and product vectorized characterizations are described in the following U.S. applications listed as follows by application number and filing date, each of which is incorporated herein by reference in its entirety: 62/323,026 filed Apr. 15, 2016; 62/341,993 filed May 26, 2016; 62/348,444 filed Jun. 10, 2016; 62/350,312 filed Jun. 15, 2016; 62/350,315 filed Jun. 15, 2016; 62/351,467 filed Jun. 17, 2016; 62/351,463 filed Jun. 17, 2016; 62/352,858 filed Jun. 21, 2016; 62/356,387 filed Jun. 29, 2016; 62/356,374 filed Jun. 29, 2016; 62/356,439 filed Jun. 29, 2016; 62/356,375 filed Jun. 29, 2016; 62/358,287 filed Jul. 5, 2016; 62/360,356 filed Jul. 9, 2016; 62/360,629 filed Jul. 11, 2016; 62/365,047 filed Jul. 21, 2016; 62/367,299 filed Jul. 27, 2016; 62/370,853 filed Aug. 4, 2016; 62/370,848 filed Aug. 4, 2016; 62/377,298 filed Aug. 19, 2016; 62/377,113 filed Aug. 19, 2016; 62/380,036 filed Aug. 26, 2016; 62/381,793 filed Aug. 31, 2016; 62/395,053 filed Sep. 15, 2016; 62/397,455 filed Sep. 21, 2016; 62/400,302 filed Sep. 27, 2016; 62/402,068 filed Sep. 30, 2016; 62/402,164 filed Sep. 30, 2016; 62/402,195 filed Sep. 30, 2016; 62/402,651 filed Sep. 30, 2016; 62/402,692 filed Sep. 30, 2016; 62/402,711 filed Sep. 30, 2016; 62/406,487 filed Oct. 11, 2016; 62/408,736 filed Oct. 15, 2016; 62/409,008 filed Oct. 17, 2016; 62/410,155 filed Oct. 19, 2016; 62/413,312 filed Oct. 26, 2016; 62/413,304 filed Oct. 26, 2016; 62/413,487 filed Oct. 27, 2016; 62/422,837 filed Nov. 16, 2016; 62/423,906 filed Nov. 18, 2016; 62/424,661 filed Nov. 21, 2016; 62/427,478 filed Nov. 29, 2016; 62/436,842 filed Dec. 20, 2016; 62/436,885 filed Dec. 20, 2016; 62/436,791 filed Dec. 20, 2016; 62/439,526 filed Dec. 28, 2016; 62/442,631 filed Jan. 5, 2017; 62/445,552 filed Jan. 12, 2017; 62/463,103 filed Feb. 24, 2017; 62/465,932 filed Mar. 2, 2017; 62/467,546 filed Mar. 6, 2017; 62/467,968 filed Mar. 7, 2017; 62/467,999 filed Mar. 7, 2017; 62/471,089 filed Mar. 14, 2017; 62/471,804 filed Mar. 15, 2017; 62/471,830 filed Mar. 15, 2017; 62/479,106 filed Mar. 30, 2017; 62/479,525 filed Mar. 31, 2017; 62/480,733 filed Apr. 3, 2017; 62/482,863 filed Apr. 7, 2017; 62/482,855 filed Apr. 7, 2017; 62/485,045 filed Apr. 13, 2017; Ser. No. 15/487,760 filed Apr. 14, 2017; Ser. No. 15/487,538 filed Apr. 14, 2017; Ser. No. 15/487,775 filed Apr. 14, 2017; Ser. No. 15/488,107 filed Apr. 14, 2017; Ser. No. 15/488,015 filed Apr. 14, 2017; Ser. No. 15/487,728 filed Apr. 14, 2017; Ser. No. 15/487,882 filed Apr. 14, 2017; Ser. No. 15/487,826 filed Apr. 14, 2017; Ser. No. 15/487,792 filed Apr. 14, 2017; Ser. No. 15/488,004 filed Apr. 14, 2017; Ser. No. 15/487,894 filed Apr. 14, 2017; 62/486,801 filed Apr. 18, 2017; 62/491,455 filed Apr. 28, 2018; 62/502,870 filed May 8, 2017; 62/510,322 filed May 24, 2017; 62/510,317 filed May 24, 2017; Ser. No. 15/606,602 filed May 26, 2017; 62/511,559 filed May 26, 2017; 62/513,490 filed Jun. 1, 2017; 62/515,675 filed Jun. 6, 2018; Ser. No. 15/624,030 filed Jun. 15, 2017; Ser. No. 15/625,599 filed Jun. 16, 2017; Ser. No. 15/628,282 filed Jun. 20, 2017; 62/523,148 filed Jun. 21, 2017; 62/525,304 filed Jun. 27, 2017; Ser. No. 15/634,862 filed Jun. 27, 2017; 62/527,445 filed Jun. 30, 2017; Ser. No. 15/655,339 filed Jul. 20, 2017; Ser. No. 15/669,546 filed Aug. 4, 2017; and 62/542,664 filed Aug. 8, 2017; 62/542,896 filed Aug. 9, 2017; Ser. No. 15/678,608 filed Aug. 16, 2017; 62/548,503 filed Aug. 22, 2017; 62/549,484 filed Aug. 24, 2017; Ser. No. 15/685,981 filed Aug. 24, 2017; 62/558,420 filed Sep. 14, 2017; Ser. No. 15/704,878 filed Sep. 14, 2017; 62/559,128 filed Sep. 15, 2017; Ser. No. 15/783,787 filed Oct. 13, 2017; Ser. No. 15/783,929 filed Oct. 13, 2017; Ser. No. 15/783,825 filed Oct. 13, 2017; Ser. No. 15/783,551 filed Oct. 13, 2017; Ser. No. 15/783,645 filed Oct. 13, 2017; Ser. No. 15/782,555 filed Oct. 13, 2017; 62/571,867 filed Oct. 13, 2017; Ser. No. 15/783,668 filed Oct. 13, 2017; Ser. No. 15/783,960 filed Oct. 13, 2017; Ser. No. 15/782,559 filed Oct. 13, 2017; Ser. No. 15/921,540 filed Mar. 14, 2018; Ser. No. 15/939,788 filed Mar. 29, 2018; Ser. No. 15/947,380 filed Apr. 6, 2018; Ser. No. 15/952,494 filed Apr. 13, 2018; and Ser. No. 15/953,113 filed Apr. 13, 2018.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system comprising:
    a plurality of cameras distributed along each aisle of a plurality of aisles of a retail environment, wherein each camera of the plurality of cameras is oriented to capture images relative to users moving along a respective aisle of the plurality of aisles;
    an image processing control circuit communicatively coupled with each of the plurality of cameras, wherein the image processing control circuit is configured to process the images from each of the plurality of cameras, determine a reliability confidence of each camera of a subset of cameras of the plurality of cameras, and determine a user field of view of a first user within a camera field of view of one or more of the cameras of the subset of cameras based on multiple images from the subset of cameras, an orientation of each camera of the subset of cameras, the camera field of view of each camera of the subset of cameras and the reliability confidences of each camera of the subset of cameras;
    a product identification control circuit communicatively coupled with the image processing control circuit, wherein the product identification control circuit is configured to identify, based on product location information, a set of multiple products within the user field of view, assign a viewing probability to each product of the set of the multiple products as a function of a distance from a determined center of the user field of view and identify a first product of the set of multiple products that the first user is viewing, prior to the first user touching the first product, as a function of the viewing probability and a user history associated with the first user;
    a product selection control circuit communicatively coupled with the product identification control circuit, wherein the product selection control circuit is configured to:
        determine a purchase probability that the first product is a product the first user intends to purchase as a function of the user history associated with the first user and prior to the first user touching the first product;
        add the first product to a virtual electronic cart as a selected set of one or more products that the first user is predicted to intend to purchase when the purchase probability of the first product exceeds a purchase probability threshold; and
        control a worker computing device to instruct a first worker to retrieve the first product for purchase by the first user and to be supplied to the first user.

2. The system of claim 1, wherein the image processing control circuit, in determining the user field of view of the first user, is configured to track eye movement of the first user over time and determine the user field of view of the first user as a function of the tracked eye movement over time.

3. The system of claim 1, wherein the image processing control circuit, in determining the user field of view of the first user, is configured to track user position and/or user orientation over time and determine the user field of view of the first user as a function of the tracked user position and/or user orientation over time.

4. The system of claim 1, wherein the image processing control circuit, in determining the reliability confidence of each camera of the subset of cameras, is configured to identify an orientation of the first user relative to the camera field of view of each of the cameras of the subset of cameras, and assign the reliability confidence of each camera of the subset of cameras as a function of the orientation of the first user relative to the camera field of view of a respective one of the cameras of the subset of cameras.

5. The system of claim 4, wherein the image processing control circuit is further communicatively coupled with an optical head mounted display system that is at least temporarily associated with the first user, wherein the image processing control circuit receives eye tracking information from the optical head mounted display system;
wherein the image processing control circuit, in determining the user field of view of the first user, is configured to determine the user field of view based on the orientations of each camera of the subset of cameras, the fields of view of each camera of the subset of cameras, the reliability confidences of each camera of the subset of cameras and the eye tracking information relative to a location of the first user.

6. The system of claim 1, wherein the image processing control circuit is further configured to identify facial features of the first user from one or more images from at least one of the cameras of the subset of cameras, identify the first user within a respective aisle of the plurality of aisles based at least on the facial features, access a user profile associated with the first user based on the identification of the first user, and access the user history through the user profile associated with the first user.

7. The system of claim 1, wherein the image processing control circuit in determining the user field of view is configured to determine, based on image processing of the multiple images from the cameras of the subset of cameras, a head orientation of a head of the first user and a facial orientation of a face of the first user, and determine the user field of view as a function of the head orientation and the facial orientation.

8. The system of claim 1, wherein the product selection control circuit, in determining the purchase probability that the first user intends to purchase the first product, obtains a duration of a gaze of the first user on the first product, obtains estimated emotions of the first user based on facial expressions occurring within a first threshold time of the duration of the gaze of the first user on the first product, and obtains body language data occurring within a second threshold time of the duration of the gaze of the first user on the first product; and
determine the purchase probability as a function of the user history associated with the first user, the duration of the gaze, the estimated emotions, and the body language.

9. The system of claim 8, further comprising a model training control circuit configured to receive notification that the first user declined to actually purchase the first product, and adjust a modeling relative to the first user based at least on the received notification and the purchase probability of the first product.

10. The system of claim 1, wherein the product selection control circuit is further configured to determine a quantity of the first product predicted to be purchased by the first user based on the user history of the first user, and in communicating the instructions to the worker computing device is further configured to instruct the quantity of the first product and control the worker computing device to instruct the first worker to retrieve the quantity of the first product for purchase by the first user.

11. A method comprising:
processing, by an image processing control circuit, images from each of a plurality of cameras, wherein the plurality of cameras are positioned and distributed along both sides of each aisle of a plurality of aisles of a retail environment, wherein each camera of the plurality of cameras is oriented to capture images relative to customers moving along a respective one of the plurality of aisles;
determining a reliability confidence of each camera of a set of multiple cameras of the plurality of cameras;
determining a customer field of view of a first customer within a camera field of view of one or more of the cameras of the set of multiple cameras based on multiple images from the set of multiple cameras of the plurality of cameras, an orientation of each camera of the set of multiple cameras, the camera field of view of each camera of the set of multiple cameras and the reliability confidences of each camera of the set of multiple cameras;
identifying, by a product identification control circuit, a set of multiple products within the customer field of view based on product location information;
assigning a viewing probability to each product of the set of multiple products as a function of a distance from a determined center of the customer field of view;
identifying a first product of the set of multiple products that the first customer is considering purchasing, without the first customer having to touch or pick up the first product, as a function of the viewing probability and a customer purchase history;
determining, by a product selection control circuit, a purchase probability that the first product is a product the first customer intends to purchase as a function of the purchase history associated with the first customer and without the first customer having to touch or pick up the first product;
adding the first product to a virtual electronic cart as a purchase set of one or more products that the first customer is predicted to intend to purchase when the purchase probability of the first product exceeds a purchase probability threshold; and
communicating instructions to a worker computing device and controlling the worker computing device to instruct a first worker to retrieve the first product for purchase by the first customer and to be supplied to the first customer.

12. The method of claim 11, wherein the determining the customer field of view of the first customer comprises tracking eye movement of the first customer over time; and
wherein the determining the customer field of view comprises determining the customer field of view of the first customer as a function of the tracked eye movement over time.

13. The method of claim 11, wherein the identifying the first product of the set of multiple products that the first customer is considering purchasing, without the first customer having to touch or pick up the first product, is a further function of body language of the first customer identified based on the multiple images.

14. The method of claim 11, wherein the determining the reliability confidence of each camera of the set of multiple cameras comprises:
identifying an orientation of the first customer relative to the camera field of view of each of the cameras of the set of multiple cameras; and
assigning the reliability confidence of each camera of the set of multiple cameras as a function of the orientation of the first customer relative to the camera field of view of a respective one of the set of multiple cameras.

15. The method of claim 14, further comprising:
receiving eye tracking information from an optical head mounted display system that is at least temporarily associated with the first customer;
wherein the determining the customer field of view of the first customer comprises determining the customer field of view based on the orientations of each camera of the set of multiple cameras, the fields of view of each camera of the set of multiple cameras, the reliability confidences of each camera of the set of multiple cameras and the eye tracking information relative to a location of the first customer.

16. The method of claim 11, further comprising:
identifying facial features of the first customer from one or more images from at least one of the cameras of the set of multiple cameras;
identifying the first customer within a respective aisle of the multiple aisles based at least on the facial features; and
accessing a customer profile associated with the first customer based on the identification of the first customer; and
accessing the customer purchase history through the customer profile associated with the first customer.

17. The method of claim 11, wherein the determining the customer field of view comprises:
determining, based on image processing of the multiple images from the cameras of the set of multiple cameras, a head orientation of a head of the first customer and a facial orientation of a face of the first customer, and determine the customer field of view as a function of the head orientation and the facial orientation.

18. The method of claim 11, wherein the determining the purchase probability that the first customer intends to purchase the first product comprises:
obtaining a duration of a gaze of the first customer on the first product;
obtaining estimated emotions of the first customer based on facial expressions occurring within a first threshold time of the duration of the gaze of the first customer on the first product;
obtaining body language data occurring within a second threshold time of the duration of the gaze of the first customer on the first product; and
determining the purchase probability as a function of the purchase history associated with the first customer, the duration of the gaze, the estimated emotions, and the body language.

19. The method of claim 18, further comprising
repeatedly training a product identification model over time, comprising receiving notification that the first customer declined to actually purchase the first product; and adjusting the model relative to the first customer based at least on the received notification and the purchase probability of the first product.

20. A system comprising:
an image processing control circuit communicatively coupled with a plurality of cameras, the plurality of cameras distributed along each aisle of a plurality of aisles of a retail environment,
wherein each camera of the plurality of cameras is oriented to capture images relative to users moving along a respective aisle of the plurality of aisles;
wherein the image processing control circuit is configured to process the images from each of the plurality of cameras, determine a reliability confidence of each camera of a subset of cameras of the plurality of cameras, and determine a user field of view of a first user within a camera field of view of one or more of the cameras of the subset of cameras based on multiple images from the subset of cameras, an orientation of each camera of the subset of cameras, the camera field of view of each camera of the subset of cameras and the reliability confidences of each camera of the subset of cameras;
a product identification control circuit communicatively coupled with the image processing control circuit, wherein the product identification control circuit is configured to identify, based on product location information, a set of multiple products within the user field of view, assign a viewing probability to each product of the set of the multiple products as a function of a distance from a determined center of the user field of view and identify a first product of the set of multiple products that the first user is viewing, prior to the first user touching the first product, as a function of the viewing probability and a user history associated with the first user;
a product selection control circuit communicatively coupled with the product identification control circuit, wherein the product selection control circuit is configured to determine a purchase probability that the first product is a product the first user intends to purchase as a function of the user history associated with the first user and prior to the first user touching the first product; add the first product to a virtual electronic cart as a selected set of one or more products that the first user is predicted to intend to purchase when the purchase probability of the first product exceeds a purchase probability threshold; and control a worker computing device to instruct a first worker to retrieve the first product for purchase by the first user and to be supplied to the first user.

* * * * *